(12) United States Patent
Brennan

(10) Patent No.: US 8,984,636 B2
(45) Date of Patent: *Mar. 17, 2015

(54) CONTENT EXTRACTOR AND ANALYSIS SYSTEM

(75) Inventor: Todd Brennan, Somerville, MA (US)

(73) Assignee: Bit9, Inc., Waltham, MA (US)

( * ) Notice: Subject to any disclaimer, the term of this patent is extended or adjusted under 35 U.S.C. 154(b) by 1344 days.

This patent is subject to a terminal disclaimer.

(21) Appl. No.: 11/194,078

(22) Filed: Jul. 29, 2005

(65) Prior Publication Data

US 2007/0028110 A1 Feb. 1, 2007

(51) Int. Cl.
- G06F 21/00 (2013.01)
- H04L 9/32 (2006.01)
- G06F 21/55 (2013.01)
- H04L 29/06 (2006.01)

(52) U.S. Cl.
CPC ............ *H04L 9/3247* (2013.01); *G06F 21/552* (2013.01); *H04L 63/145* (2013.01); *H04L 63/18* (2013.01); *H04L 63/102* (2013.01); *H04L 2209/60* (2013.01)
USPC ................ 726/24; 726/26; 713/176; 713/191

(58) Field of Classification Search
USPC ................................ 726/24, 26; 713/176, 191
See application file for complete search history.

(56) References Cited

U.S. PATENT DOCUMENTS

| | | |
|---|---|---|
| 4,809,160 A | 2/1989 | Mahon et al. |
| 4,908,861 A | 3/1990 | Brachtl et al. |
| 5,050,212 A | 9/1991 | Dyson |
| 5,144,659 A | 9/1992 | Jones |
| 5,163,147 A | 11/1992 | Orita |
| 5,175,852 A | 12/1992 | Johnson et al. |
| 5,201,043 A | 4/1993 | Crawford et al. |
| 5,241,594 A | 8/1993 | Kung |
| 5,278,901 A | 1/1994 | Shieh et al. |
| 5,283,830 A | 2/1994 | Hinsley et al. |
| 5,327,563 A | 7/1994 | Singh |
| 5,347,578 A | 9/1994 | Duxbury |
| 5,349,655 A | 9/1994 | Mann |

(Continued)

FOREIGN PATENT DOCUMENTS

| | | |
|---|---|---|
| EP | 0537925 | 4/1993 |
| EP | 0818723 | 1/1998 |

(Continued)

OTHER PUBLICATIONS

Okamoto et al., "A Distributed Approach to Computer Virus Detection and Neutralization by Autonomous and Heterogeneous Agents", 1999, The Fourth International Symposium on Autonomous Decentralized Systems, pp. 1-4.*

(Continued)

*Primary Examiner* — William Powers
(74) *Attorney, Agent, or Firm* — Goodwin Procter LLP

(57) ABSTRACT

A security system provides a defense from known and unknown viruses, worms, spyware, hackers, and unwanted software. The system can implement centralized policies that allow an administrator to approve, block, quarantine, and log file activities. The system can extract content of interest from a file container, repackage the content of interest as another valid file type, perform hashes on the content of interest, associate the hash of the container with the hash of the repackaged content, transfer the repackaged content, and store the hash with other security-related information.

26 Claims, 8 Drawing Sheets

(56) References Cited

U.S. PATENT DOCUMENTS

| | | |
|---|---|---|
| 5,355,474 A | 10/1994 | Thuraisngham et al. |
| 5,359,730 A | 10/1994 | Marron |
| 5,371,879 A | 12/1994 | Schiffleger |
| 5,408,642 A | 4/1995 | Mann |
| 5,421,006 A | 5/1995 | Jablon et al. |
| 5,428,795 A | 6/1995 | Johnson et al. |
| 5,440,723 A | 8/1995 | Arnold et al. |
| 5,444,850 A | 8/1995 | Chang |
| 5,448,668 A | 9/1995 | Perelson et al. |
| 5,452,442 A | 9/1995 | Kephart |
| 5,473,769 A | 12/1995 | Cozza |
| 5,485,575 A | 1/1996 | Chess et al. |
| 5,495,533 A * | 2/1996 | Linehan et al. ............... 713/155 |
| 5,495,571 A | 2/1996 | Corrie, Jr. et al. |
| 5,502,815 A | 3/1996 | Cozza |
| 5,511,163 A | 4/1996 | Lerche et al. |
| 5,521,849 A | 5/1996 | Adelson et al. |
| 5,528,490 A | 6/1996 | Hill |
| 5,530,757 A | 6/1996 | Krawczyk |
| 5,537,540 A | 7/1996 | Miller et al. |
| 5,566,326 A | 10/1996 | Hirsch et al. |
| 5,572,590 A | 11/1996 | Chess |
| 5,572,711 A | 11/1996 | Hirsch et al. |
| 5,579,509 A | 11/1996 | Furtney et al. |
| 5,584,023 A | 12/1996 | Hsu |
| 5,586,301 A | 12/1996 | Fisherman et al. |
| 5,613,002 A | 3/1997 | Kephart et al. |
| 5,613,107 A | 3/1997 | Villette et al. |
| 5,615,373 A | 3/1997 | Ho |
| 5,623,600 A | 4/1997 | Ji et al. |
| 5,634,053 A | 5/1997 | Noble et al. |
| 5,644,710 A | 7/1997 | Johnson et al. |
| 5,649,095 A | 7/1997 | Cozza |
| 5,649,194 A | 7/1997 | Miller et al. |
| 5,657,470 A | 8/1997 | Fisherman et al. |
| 5,664,098 A | 9/1997 | Bianchi et al. |
| 5,675,771 A | 10/1997 | Curley et al. |
| 5,675,787 A | 10/1997 | Miller et al. |
| 5,678,041 A | 10/1997 | Baker et al. |
| 5,680,547 A | 10/1997 | Chang |
| 5,689,564 A | 11/1997 | Johnson et al. |
| 5,689,700 A | 11/1997 | Miller et al. |
| 5,692,047 A | 11/1997 | McManis |
| 5,692,124 A | 11/1997 | Holden et al. |
| 5,694,569 A | 12/1997 | Fischer |
| 5,694,590 A | 12/1997 | Thuraisingham et al. |
| 5,696,822 A | 12/1997 | Nachenberg |
| 5,699,507 A | 12/1997 | Goodnow, II et al. |
| 5,701,458 A | 12/1997 | Bsaibes et al. |
| 5,701,463 A | 12/1997 | Malcolm |
| 5,708,709 A | 1/1998 | Rose |
| 5,708,780 A | 1/1998 | Levergood et al. |
| 5,724,578 A | 3/1998 | Morinaga et al. |
| 5,727,061 A | 3/1998 | Johnson et al. |
| 5,737,523 A | 4/1998 | Callaghan et al. |
| 5,757,915 A | 5/1998 | Aucsmith et al. |
| 5,778,222 A | 7/1998 | Herrick et al. |
| 5,781,915 A | 7/1998 | Kohno et al. |
| 5,787,169 A | 7/1998 | Eldridge et al. |
| 5,797,128 A | 8/1998 | Birnbaum |
| 5,799,141 A | 8/1998 | Galipeau et al. |
| 5,799,315 A | 8/1998 | Rainey et al. |
| 5,802,275 A | 9/1998 | Blonder |
| 5,815,654 A | 9/1998 | Bieda |
| 5,822,517 A | 10/1998 | Dotan |
| 5,826,013 A | 10/1998 | Nachenberg |
| 5,832,208 A * | 11/1998 | Chen et al. ..................... 726/24 |
| 5,835,601 A | 11/1998 | Shimbo et al. |
| 5,848,418 A | 12/1998 | de Souza et al. |
| 5,854,916 A | 12/1998 | Nachenberg |
| 5,859,966 A | 1/1999 | Hayman et al. |
| 5,878,417 A | 3/1999 | Baldwin et al. |
| 5,884,325 A | 3/1999 | Bauer et al. |
| 5,893,117 A | 4/1999 | Wang |
| 5,897,637 A | 4/1999 | Guha |
| 5,907,848 A | 5/1999 | Zaiken et al. |
| 5,909,689 A | 6/1999 | Van Ryzin |
| 5,911,143 A | 6/1999 | Deinhart et al. |
| 5,918,004 A | 6/1999 | Anderson et al. |
| 5,918,008 A | 6/1999 | Togawa et al. |
| 5,919,257 A | 7/1999 | Trostle |
| 5,924,096 A | 7/1999 | Draper et al. |
| 5,930,792 A | 7/1999 | Polcyn |
| 5,930,801 A | 7/1999 | Falkenhainer et al. |
| 5,937,143 A | 8/1999 | Watanabe et al. |
| 5,937,160 A | 8/1999 | Davis et al. |
| 5,940,513 A | 8/1999 | Aucsmith et al. |
| 5,948,104 A | 9/1999 | Gluck et al. |
| 5,951,698 A | 9/1999 | Chen et al. |
| 5,956,481 A | 9/1999 | Walsh et al. |
| 5,958,051 A | 9/1999 | Renaud et al. |
| 5,958,056 A | 9/1999 | Lehmann |
| 5,960,170 A | 9/1999 | Chen et al. |
| 5,966,715 A | 10/1999 | Sweeney et al. |
| 5,974,309 A | 10/1999 | Foti |
| 5,974,455 A | 10/1999 | Monier |
| 5,974,568 A | 10/1999 | McQueen |
| 5,978,484 A | 11/1999 | Apperson et al. |
| 5,978,917 A | 11/1999 | Chi |
| 5,983,012 A | 11/1999 | Bianchi et al. |
| 5,983,348 A | 11/1999 | Ji |
| 5,983,350 A | 11/1999 | Minear et al. |
| 5,987,123 A | 11/1999 | Scott et al. |
| 5,987,133 A | 11/1999 | Aisaka |
| 5,991,772 A | 11/1999 | Doherty et al. |
| 5,991,856 A | 11/1999 | Spilo et al. |
| 5,999,932 A | 12/1999 | Paul |
| 6,006,228 A | 12/1999 | McCollum et al. |
| 6,006,329 A | 12/1999 | Chi |
| 6,018,747 A | 1/2000 | Burns et al. |
| 6,021,491 A | 2/2000 | Renaud |
| 6,021,510 A | 2/2000 | Nachenberg |
| 6,023,586 A | 2/2000 | Gaisford et al. |
| 6,023,723 A | 2/2000 | McCormick et al. |
| 6,026,402 A | 2/2000 | Vossen et al. |
| 6,026,502 A | 2/2000 | Wakayama |
| 6,029,175 A | 2/2000 | Chow et al. |
| 6,029,256 A | 2/2000 | Kouznetsov |
| 6,035,423 A | 3/2000 | Hodges et al. |
| 6,044,381 A | 3/2000 | Boothby et al. |
| 6,044,469 A | 3/2000 | Horstmann |
| 6,049,612 A | 4/2000 | Fielder et al. |
| 6,052,531 A | 4/2000 | Waldin, Jr. et al. |
| 6,055,527 A | 4/2000 | Badger et al. |
| 6,055,534 A | 4/2000 | Nishino |
| 6,061,686 A | 5/2000 | Gauvin et al. |
| 6,061,795 A | 5/2000 | Dircks et al. |
| 6,073,128 A | 6/2000 | Pongracz et al. |
| 6,073,239 A | 6/2000 | Dotan |
| 6,081,894 A | 6/2000 | Mann |
| 6,081,898 A | 6/2000 | Miller et al. |
| 6,092,161 A | 7/2000 | White et al. |
| 6,094,731 A | 7/2000 | Waldin et al. |
| 6,098,079 A | 8/2000 | Howard |
| 6,108,799 A | 8/2000 | Boulay et al. |
| 6,119,151 A * | 9/2000 | Cantrell et al. ............... 709/216 |
| 6,119,165 A | 9/2000 | Li et al. |
| 6,122,631 A | 9/2000 | Berbec et al. |
| 6,122,738 A | 9/2000 | Millard |
| 6,123,737 A | 9/2000 | Sadowsky |
| 6,128,774 A | 10/2000 | Necula et al. |
| 6,134,447 A | 10/2000 | Havinis et al. |
| 6,138,238 A | 10/2000 | Scheifler et al. |
| 6,141,771 A | 10/2000 | O'Brien et al. |
| 6,154,751 A | 11/2000 | Ault et al. |
| 6,154,775 A | 11/2000 | Coss et al. |
| 6,161,145 A | 12/2000 | Bainbridge et al. |
| 6,163,859 A | 12/2000 | Lee et al. |
| 6,173,284 B1 | 1/2001 | Brown |
| 6,178,508 B1 | 1/2001 | Kaufman |
| 6,195,587 B1 | 2/2001 | Hruska et al. |
| 6,199,181 B1 | 3/2001 | Rechef et al. |
| 6,205,445 B1 | 3/2001 | Tokuyama |
| 6,205,558 B1 | 3/2001 | Sobel |

(56) References Cited

U.S. PATENT DOCUMENTS

| | | |
|---|---|---|
| 6,208,986 B1 | 3/2001 | Schneck et al. |
| 6,219,818 B1 | 4/2001 | Freivald et al. |
| 6,226,652 B1 | 5/2001 | Percival et al. |
| 6,230,156 B1 | 5/2001 | Hussey |
| 6,230,288 B1 | 5/2001 | Kuo et al. |
| 6,230,316 B1 | 5/2001 | Nachenberg |
| 6,233,576 B1 | 5/2001 | Lewis |
| 6,237,144 B1 | 5/2001 | Delo |
| 6,240,530 B1 | 5/2001 | Togawa |
| 6,240,531 B1 | 5/2001 | Spilo et al. |
| 6,243,716 B1 | 6/2001 | Waldo et al. |
| 6,249,805 B1 | 6/2001 | Fleming, III |
| 6,263,342 B1 | 7/2001 | Chang et al. |
| 6,263,388 B1 | 7/2001 | Cromer et al. |
| 6,263,444 B1 | 7/2001 | Fujita |
| 6,263,457 B1 | 7/2001 | Anderson et al. |
| 6,269,456 B1 | 7/2001 | Hodges et al. |
| 6,272,488 B1 | 8/2001 | Chang et al. |
| 6,272,641 B1 | 8/2001 | Ji |
| 6,275,938 B1 | 8/2001 | Bond et al. |
| 6,279,111 B1 | 8/2001 | Jensenworth et al. |
| 6,282,701 B1 | 8/2001 | Wygodny et al. |
| 6,301,660 B1 | 10/2001 | Benson |
| 6,301,666 B1 | 10/2001 | Rive |
| 6,301,670 B1 | 10/2001 | Motoyama et al. |
| 6,308,173 B1 | 10/2001 | Glasser et al. |
| 6,308,274 B1 | 10/2001 | Swift |
| 6,311,187 B1 | 10/2001 | Jeyaraman |
| 6,317,742 B1 | 11/2001 | Nagaratnam et al. |
| 6,321,254 B1 | 11/2001 | Meyer et al. |
| 6,324,537 B1 | 11/2001 | Moran |
| 6,334,150 B1 | 12/2001 | Cromer et al. |
| 6,338,141 B1 | 1/2002 | Wells |
| 6,338,149 B1 | 1/2002 | Ciccone, Jr. et al. |
| 6,349,311 B1 | 2/2002 | Sobel et al. |
| 6,351,776 B1 | 2/2002 | O'Brien et al. |
| 6,357,008 B1 | 3/2002 | Nachenberg |
| 6,366,933 B1 * | 4/2002 | Ball et al. ..................... 715/203 |
| 6,370,648 B1 | 4/2002 | Diep |
| 6,378,069 B1 | 4/2002 | Sandler et al. |
| 6,397,329 B1 | 5/2002 | Aiello et al. |
| 6,401,210 B1 | 6/2002 | Templeton |
| 6,427,000 B1 | 7/2002 | Mumford et al. |
| 6,430,561 B1 | 8/2002 | Austel et al. |
| 6,434,607 B1 | 8/2002 | Haverstock et al. |
| 6,434,615 B1 | 8/2002 | Dinh et al. |
| 6,453,347 B1 | 9/2002 | Revashetti et al. |
| 6,470,329 B1 | 10/2002 | Livschitz |
| 6,490,583 B2 | 12/2002 | Tada et al. |
| 6,493,744 B1 | 12/2002 | Emens et al. |
| 6,505,237 B2 | 1/2003 | Beyda et al. |
| 6,505,300 B2 | 1/2003 | Chan et al. |
| 6,513,039 B1 | 1/2003 | Kraenzel |
| 6,513,111 B2 | 1/2003 | Klimczak et al. |
| 6,513,122 B1 | 1/2003 | Magdych et al. |
| 6,516,395 B1 | 2/2003 | Christie |
| 6,539,266 B1 | 3/2003 | Ishikawa |
| 6,550,061 B1 | 4/2003 | Bearden et al. |
| 6,560,776 B1 | 5/2003 | Breggin et al. |
| 6,574,657 B1 | 6/2003 | Dickinson |
| 6,578,046 B2 | 6/2003 | Chang et al. |
| 6,584,569 B2 | 6/2003 | Reshef et al. |
| 6,594,665 B1 | 7/2003 | Sowa et al. |
| 6,594,671 B1 | 7/2003 | Aman et al. |
| 6,598,090 B2 | 7/2003 | Champlin |
| 6,603,396 B2 | 8/2003 | Lewis et al. |
| 6,618,727 B1 | 9/2003 | Wheeler et al. |
| 6,618,735 B1 | 9/2003 | Krishnaswami et al. |
| 6,618,810 B1 | 9/2003 | Dirie |
| 6,631,480 B2 | 10/2003 | Zeigler et al. |
| 6,638,314 B1 | 10/2003 | Meyerzon et al. |
| 6,640,219 B2 | 10/2003 | Fernandes et al. |
| 6,640,287 B2 | 10/2003 | Gharachorloo et al. |
| 6,640,317 B1 | 10/2003 | Snow |
| 6,643,653 B1 | 11/2003 | Chu |
| 6,647,388 B2 * | 11/2003 | Numao et al. ..................... 1/1 |
| 6,647,400 B1 | 11/2003 | Moran |
| 6,651,249 B2 | 11/2003 | Waldin et al. |
| 6,654,746 B1 | 11/2003 | Wong et al. |
| 6,654,751 B1 | 11/2003 | Schmugar et al. |
| 6,658,406 B1 | 12/2003 | Mazner et al. |
| 6,658,573 B1 | 12/2003 | Bischof et al. |
| 6,662,198 B2 * | 12/2003 | Satyanarayanan et al. ............. 1/1 |
| 6,675,205 B2 | 1/2004 | Meadway et al. |
| 6,678,741 B1 * | 1/2004 | Northcutt et al. ............. 709/248 |
| 6,681,227 B1 | 1/2004 | Kojima et al. |
| 6,681,344 B1 | 1/2004 | Andrew |
| 6,681,387 B1 | 1/2004 | Hwu et al. |
| 6,684,210 B1 | 1/2004 | Takechi et al. |
| 6,694,328 B1 | 2/2004 | Bennett |
| 6,694,336 B1 | 2/2004 | Multer et al. |
| 6,694,457 B2 | 2/2004 | McKee |
| 6,697,810 B2 | 2/2004 | Kumar et al. |
| 6,697,950 B1 | 2/2004 | Ko |
| 6,708,174 B1 | 3/2004 | Tenorio |
| 6,711,557 B1 | 3/2004 | Palaniappan |
| 6,711,572 B2 | 3/2004 | Zakharov et al. |
| 6,711,583 B2 | 3/2004 | Chess et al. |
| 6,715,106 B1 | 3/2004 | Mermelstein |
| 6,721,767 B2 | 4/2004 | De Meno et al. |
| 6,721,795 B1 | 4/2004 | Eldreth |
| 6,725,377 B1 | 4/2004 | Kouznetsov |
| 6,728,886 B1 | 4/2004 | Ji et al. |
| 6,732,125 B1 | 5/2004 | Autrey et al. |
| 6,732,358 B1 | 5/2004 | Siefert |
| 6,735,700 B1 | 5/2004 | Flint et al. |
| 6,742,023 B1 | 5/2004 | Fanning et al. |
| 6,742,121 B1 | 5/2004 | Safadi |
| 6,745,329 B1 | 6/2004 | Kao |
| 6,748,534 B1 | 6/2004 | Gryaznov et al. |
| 6,757,830 B1 | 6/2004 | Tarbotton et al. |
| 6,760,840 B1 | 7/2004 | Shimbo et al. |
| 6,763,466 B1 | 7/2004 | Glover |
| 6,772,340 B1 | 8/2004 | Peinado et al. |
| 6,775,780 B1 | 8/2004 | Muttik |
| 6,779,117 B1 | 8/2004 | Wells |
| 6,782,349 B2 | 8/2004 | Challener et al. |
| 6,783,799 B1 | 8/2004 | Goodson |
| 6,785,721 B1 * | 8/2004 | Immerman et al. ........... 709/220 |
| 6,785,732 B1 | 8/2004 | Bates et al. |
| 6,785,818 B1 | 8/2004 | Sobel et al. |
| 6,786,076 B2 | 9/2004 | Raisanen |
| 6,792,416 B2 | 9/2004 | Soetarman et al. |
| 6,792,540 B1 | 9/2004 | Smith et al. |
| 6,802,012 B1 | 10/2004 | Smithson et al. |
| 6,802,028 B1 | 10/2004 | Ruff et al. |
| 6,813,712 B1 | 11/2004 | Luke |
| 6,816,596 B1 | 11/2004 | Peinado et al. |
| 6,820,082 B1 | 11/2004 | Cook et al. |
| 6,823,398 B1 | 11/2004 | Lee et al. |
| 6,826,697 B1 | 11/2004 | Moran |
| 6,829,355 B2 | 12/2004 | Lilly |
| 6,829,708 B1 | 12/2004 | Peinado et al. |
| 6,839,721 B2 | 1/2005 | Schwols |
| 7,203,966 B2 | 4/2007 | Abburi et al. |
| 7,483,993 B2 * | 1/2009 | Nachenberg et al. ......... 709/229 |
| 7,603,440 B1 * | 10/2009 | Grabowski et al. ........... 709/220 |
| 2001/0005889 A1 | 6/2001 | Albrecht |
| 2001/0027457 A1 | 10/2001 | Yee |
| 2001/0032188 A1 | 10/2001 | Miyabe et al. |
| 2001/0033657 A1 | 10/2001 | Lipton et al. |
| 2001/0037323 A1 | 11/2001 | Moulton et al. |
| 2001/0039622 A1 | 11/2001 | Hitz et al. |
| 2001/0042204 A1 | 11/2001 | Blaker et al. |
| 2001/0044901 A1 | 11/2001 | Grawrock |
| 2001/0056541 A1 | 12/2001 | Matsuzaki et al. |
| 2002/0002684 A1 | 1/2002 | Fox et al. |
| 2002/0004902 A1 | 1/2002 | Toh et al. |
| 2002/0004908 A1 | 1/2002 | Galea |
| 2002/0019932 A1 | 2/2002 | Toh et al. |
| 2002/0026576 A1 | 2/2002 | Das-Purkayastha et al. |
| 2002/0046350 A1 | 4/2002 | Lordemann et al. |
| 2002/0048372 A1 | 4/2002 | Toh et al. |
| 2002/0051630 A1 | 5/2002 | Sasaki et al. |

(56) References Cited

U.S. PATENT DOCUMENTS

| | | |
|---|---|---|
| 2002/0062449 A1 | 5/2002 | Perna et al. |
| 2002/0065892 A1 | 5/2002 | Malik |
| 2002/0073313 A1 | 6/2002 | Brown et al. |
| 2002/0073323 A1 | 6/2002 | Jordan |
| 2002/0080962 A1 | 6/2002 | Hill |
| 2002/0083168 A1 | 6/2002 | Sweeney et al. |
| 2002/0087558 A1 | 7/2002 | Bailey et al. |
| 2002/0087876 A1 | 7/2002 | Larose |
| 2002/0095413 A1 | 7/2002 | Meding et al. |
| 2002/0095589 A1 | 7/2002 | Keech |
| 2002/0095598 A1 | 7/2002 | Camble et al. |
| 2002/0095671 A1 | 7/2002 | Delo et al. |
| 2002/0099952 A1 | 7/2002 | Lambert et al. |
| 2002/0101998 A1 | 8/2002 | Wong et al. |
| 2002/0111911 A1 | 8/2002 | Kennedy et al. |
| 2002/0111993 A1 | 8/2002 | Reed |
| 2002/0116293 A1 | 8/2002 | Lao et al. |
| 2002/0116406 A1 | 8/2002 | Goldick |
| 2002/0116542 A1 | 8/2002 | Tarbotton et al. |
| 2002/0116630 A1 | 8/2002 | Stehlin |
| 2002/0120575 A1 | 8/2002 | Pearson et al. |
| 2002/0120858 A1 | 8/2002 | Porter et al. |
| 2002/0128935 A1 | 9/2002 | White et al. |
| 2002/0129237 A1 | 9/2002 | Radatti et al. |
| 2002/0129238 A1 | 9/2002 | Toh et al. |
| 2002/0133590 A1 | 9/2002 | McBrearty et al. |
| 2002/0133710 A1 | 9/2002 | Tarbotton et al. |
| 2002/0144114 A1 | 10/2002 | Barnard et al. |
| 2002/0144129 A1 | 10/2002 | Malivanchuk et al. |
| 2002/0144130 A1 | 10/2002 | Rosner et al. |
| 2002/0146121 A1 | 10/2002 | Cohen |
| 2002/0146122 A1 | 10/2002 | Vestergaard et al. |
| 2002/0147923 A1 | 10/2002 | Dotan |
| 2002/0152395 A1 | 10/2002 | Zhang et al. |
| 2002/0157008 A1 | 10/2002 | Radatti |
| 2002/0162053 A1 | 10/2002 | Os |
| 2002/0164023 A1 | 11/2002 | Koelle et al. |
| 2002/0170052 A1* | 11/2002 | Radatti ................ 717/171 |
| 2002/0174349 A1 | 11/2002 | Wolff et al. |
| 2002/0174350 A1 | 11/2002 | Franczek et al. |
| 2002/0178271 A1 | 11/2002 | Graham et al. |
| 2002/0178374 A1 | 11/2002 | Swimmer et al. |
| 2002/0184521 A1 | 12/2002 | Lucovsky et al. |
| 2002/0191791 A1 | 12/2002 | Anand |
| 2002/0191792 A1 | 12/2002 | Anand |
| 2002/0194490 A1 | 12/2002 | Halperin et al. |
| 2003/0004922 A1 | 1/2003 | Schmidt et al. |
| 2003/0018903 A1 | 1/2003 | Greca et al. |
| 2003/0023560 A1 | 1/2003 | Soma |
| 2003/0023857 A1 | 1/2003 | Hinchliffe et al. |
| 2003/0023864 A1 | 1/2003 | Muttik et al. |
| 2003/0023866 A1 | 1/2003 | Hinchliffe et al. |
| 2003/0023867 A1 | 1/2003 | Thibadeau |
| 2003/0028785 A1 | 2/2003 | Pak et al. |
| 2003/0033303 A1 | 2/2003 | Collins |
| 2003/0033308 A1 | 2/2003 | Patel et al. |
| 2003/0046244 A1 | 3/2003 | Shear et al. |
| 2003/0046369 A1 | 3/2003 | Sim et al. |
| 2003/0046558 A1 | 3/2003 | Teblyashkin et al. |
| 2003/0050962 A1 | 3/2003 | Monsen et al. |
| 2003/0056103 A1 | 3/2003 | Levy et al. |
| 2003/0061502 A1 | 3/2003 | Teblyashkin et al. |
| 2003/0065926 A1 | 4/2003 | Schultz et al. |
| 2003/0074578 A1 | 4/2003 | Ford et al. |
| 2003/0084152 A1 | 5/2003 | Chung |
| 2003/0084324 A1 | 5/2003 | Koved et al. |
| 2003/0084325 A1 | 5/2003 | Koved et al. |
| 2003/0088515 A1 | 5/2003 | Cooper et al. |
| 2003/0093682 A1 | 5/2003 | Carmona et al. |
| 2003/0093719 A1 | 5/2003 | Ali-Santosa et al. |
| 2003/0097558 A1 | 5/2003 | England et al. |
| 2003/0101234 A1 | 5/2003 | McBrearty et al. |
| 2003/0101381 A1 | 5/2003 | Mateev et al. |
| 2003/0105780 A1 | 6/2003 | Tamura et al. |
| 2003/0105973 A1 | 6/2003 | Liang et al. |
| 2003/0105975 A1 | 6/2003 | Nagoya et al. |
| 2003/0110131 A1 | 6/2003 | Alain et al. |
| 2003/0110169 A1 | 6/2003 | Zuili et al. |
| 2003/0110172 A1 | 6/2003 | Selman et al. |
| 2003/0115483 A1 | 6/2003 | Liang |
| 2003/0120601 A1 | 6/2003 | Ouye et al. |
| 2003/0120655 A1 | 6/2003 | Ohwada et al. |
| 2003/0120935 A1 | 6/2003 | Teal et al. |
| 2003/0120947 A1 | 6/2003 | Moore et al. |
| 2003/0120949 A1 | 6/2003 | Redlich et al. |
| 2003/0120950 A1 | 6/2003 | Hunt |
| 2003/0126449 A1 | 7/2003 | Kelly et al. |
| 2003/0131248 A1 | 7/2003 | Huang |
| 2003/0135514 A1 | 7/2003 | Patel et al. |
| 2003/0138100 A1 | 7/2003 | Ishizaka et al. |
| 2003/0140066 A1 | 7/2003 | Monahan |
| 2003/0140097 A1 | 7/2003 | Schloer |
| 2003/0140236 A1 | 7/2003 | Mueller |
| 2003/0145213 A1 | 7/2003 | Carbone |
| 2003/0145253 A1 | 7/2003 | de Bonet |
| 2003/0154200 A1 | 8/2003 | Von Savigny |
| 2003/0154394 A1 | 8/2003 | Levin |
| 2003/0158872 A1 | 8/2003 | Adams |
| 2003/0159060 A1 | 8/2003 | Gales et al. |
| 2003/0159064 A1 | 8/2003 | Takahashi |
| 2003/0159090 A1 | 8/2003 | Wray et al. |
| 2003/0163723 A1 | 8/2003 | Kozuch et al. |
| 2003/0172291 A1 | 9/2003 | Judge et al. |
| 2003/0177194 A1 | 9/2003 | Crocker et al. |
| 2003/0178381 A1 | 9/2003 | Liang |
| 2003/0182552 A1 | 9/2003 | Tanimoto et al. |
| 2003/0182561 A1 | 9/2003 | Challener et al. |
| 2003/0187848 A1 | 10/2003 | Ghukasyan et al. |
| 2003/0188174 A1 | 10/2003 | Zisowski |
| 2003/0191953 A1 | 10/2003 | Pandit et al. |
| 2003/0191957 A1 | 10/2003 | Hypponen et al. |
| 2003/0192041 A1 | 10/2003 | Mentze et al. |
| 2003/0196102 A1 | 10/2003 | McCarroll |
| 2003/0196103 A1 | 10/2003 | Edwards et al. |
| 2003/0196145 A1 | 10/2003 | Shen et al. |
| 2003/0198145 A1 | 10/2003 | Kimura et al. |
| 2003/0200207 A1 | 10/2003 | Dickinson |
| 2003/0200215 A1 | 10/2003 | Chen et al. |
| 2003/0200454 A1 | 10/2003 | Foster et al. |
| 2003/0208687 A1 | 11/2003 | Liang et al. |
| 2003/0217008 A1 | 11/2003 | Habegger et al. |
| 2003/0217275 A1 | 11/2003 | Bentley et al. |
| 2003/0217281 A1 | 11/2003 | Ryan |
| 2003/0217286 A1 | 11/2003 | Carmona et al. |
| 2003/0233564 A1 | 12/2003 | LaRose et al. |
| 2003/0233570 A1 | 12/2003 | Kahn et al. |
| 2003/0233642 A1 | 12/2003 | Hank |
| 2003/0236995 A1 | 12/2003 | Fretwell |
| 2004/0003274 A1 | 1/2004 | Strom et al. |
| 2004/0003279 A1 | 1/2004 | Beilinson et al. |
| 2004/0010602 A1 | 1/2004 | Van Vleck et al. |
| 2004/0019878 A1 | 1/2004 | Kotnur et al. |
| 2004/0025043 A1 | 2/2004 | Gallagher et al. |
| 2004/0030913 A1 | 2/2004 | Liang et al. |
| 2004/0031028 A1 | 2/2004 | Hunt et al. |
| 2004/0034638 A1 | 2/2004 | Brown et al. |
| 2004/0034794 A1 | 2/2004 | Mayer et al. |
| 2004/0039921 A1 | 2/2004 | Chuang |
| 2004/0039924 A1 | 2/2004 | Baldwin et al. |
| 2004/0039932 A1 | 2/2004 | Elazar et al. |
| 2004/0044628 A1 | 3/2004 | Mathew et al. |
| 2004/0049521 A1 | 3/2004 | Borrowman |
| 2004/0054893 A1 | 3/2004 | Ellis |
| 2004/0054894 A1 | 3/2004 | Lambert |
| 2004/0054917 A1 | 3/2004 | Obrecht et al. |
| 2004/0064454 A1 | 4/2004 | Ross et al. |
| 2004/0064736 A1 | 4/2004 | Obrecht et al. |
| 2004/0068559 A1 | 4/2004 | Shaw |
| 2004/0068662 A1 | 4/2004 | Ho et al. |
| 2004/0068663 A1 | 4/2004 | Sobel |
| 2004/0068664 A1 | 4/2004 | Nachenberg et al. |
| 2004/0073607 A1 | 4/2004 | Su et al. |
| 2004/0073789 A1 | 4/2004 | Powers |
| 2004/0078580 A1 | 4/2004 | Hsu et al. |

(56) References Cited

U.S. PATENT DOCUMENTS

| | | |
|---|---|---|
| 2004/0078689 A1 | 4/2004 | Knuutila et al. |
| 2004/0083383 A1 | 4/2004 | Carmona |
| 2004/0088564 A1 | 5/2004 | Norman |
| 2004/0093396 A1 | 5/2004 | Akune |
| 2004/0103096 A1 | 5/2004 | Larsen |
| 2004/0103098 A1 | 5/2004 | Mitra |
| 2004/0103202 A1 | 5/2004 | Hildebrand et al. |
| 2004/0107349 A1 | 6/2004 | Sasselli et al. |
| 2004/0107386 A1 | 6/2004 | Burdick et al. |
| 2004/0111414 A1 | 6/2004 | Cornford et al. |
| 2004/0111608 A1 | 6/2004 | Oom Temudo de Castro et al. |
| 2004/0111620 A1 | 6/2004 | Saunders et al. |
| 2004/0111632 A1 | 6/2004 | Halperin |
| 2004/0111641 A1 | 6/2004 | Oshima et al. |
| 2004/0117371 A1 | 6/2004 | Bhide et al. |
| 2004/0117615 A1 | 6/2004 | O'Donnell et al. |
| 2004/0117640 A1 | 6/2004 | Chu et al. |
| 2004/0117641 A1 | 6/2004 | Kennedy et al. |
| 2004/0117648 A1 | 6/2004 | Kissel |
| 2004/0123116 A1 | 6/2004 | Jin et al. |
| 2004/0123117 A1 | 6/2004 | Berger |
| 2004/0128169 A1 | 7/2004 | Lusen |
| 2004/0133777 A1 | 7/2004 | Kiriansky et al. |
| 2004/0133796 A1 | 7/2004 | Cohen et al. |
| 2004/0139165 A1 | 7/2004 | McMillan et al. |
| 2004/0139334 A1 | 7/2004 | Wiseman |
| 2004/0143575 A1 | 7/2004 | Cherkasova |
| 2004/0143576 A1 | 7/2004 | Cherkasova |
| 2004/0143749 A1 | 7/2004 | Tajalli et al. |
| 2004/0143756 A1 | 7/2004 | Munson et al. |
| 2004/0148514 A1 | 7/2004 | Fee et al. |
| 2004/0153452 A1 | 8/2004 | Carro |
| 2004/0153644 A1 | 8/2004 | McCorkendale et al. |
| 2004/0153830 A1 | 8/2004 | Cebula et al. |
| 2004/0158725 A1 | 8/2004 | Szor |
| 2004/0158729 A1 | 8/2004 | Szor |
| 2004/0158730 A1 | 8/2004 | Sarkar |
| 2004/0158817 A1 | 8/2004 | Okachi et al. |
| 2004/0162781 A1 | 8/2004 | Searl et al. |
| 2004/0162876 A1 | 8/2004 | Kohavi |
| 2004/0162989 A1 | 8/2004 | Kirovski |
| 2004/0167939 A1 | 8/2004 | Margolus et al. |
| 2004/0167940 A1 | 8/2004 | Margolus et al. |
| 2004/0168005 A1 | 8/2004 | Civlin |
| 2004/0168085 A1 | 8/2004 | Omote et al. |
| 2004/0168165 A1 | 8/2004 | Kokkinen |
| 2004/0172397 A1 | 9/2004 | Asherman |
| 2004/0172543 A1 | 9/2004 | Sato et al. |
| 2004/0172551 A1 | 9/2004 | Fielding et al. |
| 2004/0177270 A1 | 9/2004 | Little et al. |
| 2004/0181677 A1 | 9/2004 | Hong et al. |
| 2004/0181684 A1 | 9/2004 | Hong et al. |
| 2004/0181787 A1 | 9/2004 | Wickham et al. |
| 2004/0181790 A1 | 9/2004 | Herrick |
| 2004/0186893 A1 | 9/2004 | Ochiai |
| 2004/0187010 A1 | 9/2004 | Anderson et al. |
| 2004/0187103 A1 | 9/2004 | Wickham et al. |
| 2004/0193606 A1 | 9/2004 | Arai et al. |
| 2004/0193895 A1 | 9/2004 | Kaneko |
| 2004/0193896 A1 | 9/2004 | Kaneko |
| 2004/0193911 A1 | 9/2004 | Kaler et al. |
| 2004/0193915 A1 | 9/2004 | Smith et al. |
| 2004/0199513 A1 | 10/2004 | Dobberpuhl et al. |
| 2004/0199827 A1 | 10/2004 | Muttik et al. |
| 2004/0205090 A1 | 10/2004 | Shimbo et al. |
| 2004/0205340 A1 | 10/2004 | Shimbo et al. |
| 2004/0205354 A1 | 10/2004 | Gabriel et al. |
| 2004/0205411 A1 | 10/2004 | Hong et al. |
| 2004/0205419 A1 | 10/2004 | Liang et al. |
| 2004/0210891 A1 | 10/2004 | Kouznetsov et al. |
| 2004/0210893 A1 | 10/2004 | Chamberlain et al. |
| 2004/0220878 A1 | 11/2004 | Lao et al. |
| 2004/0220880 A1 | 11/2004 | Stefik et al. |
| 2004/0220979 A1 | 11/2004 | Young et al. |
| 2004/0225873 A1 | 11/2004 | Diaz |
| 2004/0225877 A1 | 11/2004 | Huang |
| 2004/0225893 A1 | 11/2004 | Ng |
| 2004/0230529 A1 | 11/2004 | Tieu et al. |
| 2004/0230530 A1 | 11/2004 | Searl et al. |
| 2004/0236745 A1 | 11/2004 | Keohane et al. |
| 2004/0236799 A1 | 11/2004 | Apte et al. |
| 2004/0237079 A1 | 11/2004 | Cox et al. |
| 2004/0243581 A1 | 12/2004 | Weissman et al. |
| 2004/0243585 A1 | 12/2004 | Jacobs et al. |
| 2004/0243824 A1 | 12/2004 | Jones |
| 2004/0243829 A1 | 12/2004 | Jordan |
| 2004/0243834 A1 | 12/2004 | Stefik et al. |
| 2004/0243836 A1 | 12/2004 | England et al. |
| 2004/0249814 A1 | 12/2004 | Navarre et al. |
| 2004/0250086 A1 | 12/2004 | Maucher |
| 2004/0250110 A1 | 12/2004 | Wray et al. |
| 2004/0254936 A1 | 12/2004 | Mohamed |
| 2004/0255163 A1 | 12/2004 | Swimmer et al. |
| 2004/0255165 A1 | 12/2004 | Szor |
| 2004/0260930 A1 | 12/2004 | Malik et al. |
| 2004/0260940 A1 | 12/2004 | Berg et al. |
| 2004/0267751 A1 | 12/2004 | Dill et al. |
| 2004/0267752 A1 | 12/2004 | Wong et al. |
| 2004/0267754 A1 | 12/2004 | Aono |
| 2004/0267836 A1 | 12/2004 | Armangau et al. |
| 2004/0267837 A1 | 12/2004 | Wang et al. |
| 2004/0267886 A1 | 12/2004 | Malik |
| 2005/0004873 A1 | 1/2005 | Pou et al. |
| 2005/0004874 A1 | 1/2005 | Gilmour et al. |
| 2005/0004954 A1 | 1/2005 | Soule, III |
| 2005/0005017 A1 | 1/2005 | Ptacek et al. |
| 2005/0005105 A1 | 1/2005 | Brown et al. |
| 2005/0005161 A1 | 1/2005 | Baldwin |
| 2005/0005168 A1 | 1/2005 | Dick |
| 2005/0010804 A1 | 1/2005 | Bruening et al. |
| 2005/0010806 A1 | 1/2005 | Berg et al. |
| 2005/0015591 A1 | 1/2005 | Thrash et al. |
| 2005/0015592 A1 | 1/2005 | Lin |
| 2005/0015675 A1 | 1/2005 | Kolawa et al. |
| 2005/0015760 A1 | 1/2005 | Ivanov et al. |
| 2005/0021994 A1 | 1/2005 | Barton et al. |
| 2005/0022004 A1 | 1/2005 | Mihcak et al. |
| 2005/0022016 A1 | 1/2005 | Shipp |
| 2005/0022018 A1 | 1/2005 | Szor |
| 2005/0028002 A1 | 2/2005 | Christodorescu et al. |
| 2005/0033975 A1 | 2/2005 | Lahti et al. |
| 2005/0033976 A1 | 2/2005 | Doherty et al. |
| 2005/0033978 A1 | 2/2005 | Hyser |
| 2005/0033980 A1 | 2/2005 | Willman et al. |

FOREIGN PATENT DOCUMENTS

| | | |
|---|---|---|
| EP | 1049014 | 11/2000 |
| EP | 1069745 | 1/2001 |
| EP | 1076336 | 2/2001 |
| EP | 1113617 | 7/2001 |
| EP | 1132799 | 9/2001 |
| EP | 1315067 | 5/2003 |
| EP | 1396978 | 3/2004 |
| EP | 1418704 | 5/2004 |
| EP | 1457885 | 9/2004 |
| EP | 1467283 | 10/2004 |
| WO | WO9313477 | 7/1993 |
| WO | WO9325024 | 12/1993 |
| WO | WO9617286 | 6/1996 |
| WO | WO9834173 | 8/1998 |
| WO | WO9850843 | 11/1998 |
| WO | WO9850853 | 11/1998 |
| WO | WO0051286 | 8/2000 |
| WO | WO0059177 | 10/2000 |
| WO | WO0064095 | 10/2000 |
| WO | WO0067130 | 11/2000 |
| WO | WO0072200 | 11/2000 |
| WO | WO0101629 | 1/2001 |
| WO | WO0106703 | 1/2001 |
| WO | WO0109703 | 2/2001 |
| WO | WO0111623 | 2/2001 |
| WO | WO0113574 | 2/2001 |
| WO | WO0118633 | 3/2001 |

(56) References Cited

FOREIGN PATENT DOCUMENTS

| WO | WO0148634 | 7/2001 |
|---|---|---|
| WO | WO0173533 | 10/2001 |
| WO | WO0177908 | 10/2001 |
| WO | WO0180482 | 10/2001 |
| WO | WO0182033 | 11/2001 |
| WO | WO0237222 | 5/2002 |
| WO | WO03003172 | 1/2003 |
| WO | WO03019334 | 3/2003 |
| WO | WO03034654 | 4/2003 |
| WO | WO03083670 | 10/2003 |
| WO | WO03085536 | 10/2003 |
| WO | WO03090131 | 10/2003 |
| WO | WO03100556 | 12/2003 |
| WO | WO03100582 | 12/2003 |
| WO | WO2004010353 | 1/2004 |
| WO | WO2004017599 | 2/2004 |
| WO | WO2004044756 | 5/2004 |
| WO | WO2004057446 | 7/2004 |
| WO | WO2004084049 | 9/2004 |
| WO | WO2004091135 | 10/2004 |
| WO | WO2004102361 | 11/2004 |

OTHER PUBLICATIONS

Somayaji et al., "Principles of a Computer Immune System", 1997, Proceedings of the 1997 Workshop on New Security Paradigms, pp. 1-8.*

Patent Cooperation Treaty, International Search Report, dated Jun. 17, 2008, 2 pages.

Bit9 Officially Launches Parity Endpoint Security Solution, News and Events, Highland Capital Partners, Sep. 20, 2005.

3 IT Projects Among NIST Grants, Washington Technology, Aug. 18, 2003.

New ATP Awards Announced in 2003, Advanced Technology Program, Jul. 1, 2003.

2003 Annual Report of the Advanced Technology Program Advisory Committee, U.S. Department of Commerce, May 2004.

Computer Immune System, Project Brief, Advanced Technology Program, Jul. 2003.

"Building Diverse Computer Systems," S. Forrest, et al, The 6th Workshop on Hot Topics in Operating Systems, IEEE Computer Society Press, 1997.

"A Sense of Self for Unix Processes," S. Forrest, et al., IEEE Symposium on Security and Privacy, 1996.

"Intrusion Detection Using Sequences of System Calls," S. Hofmeyr, et al, Dept. of Computer Science, University of New Mexico, 1997.

"Detecting Intrusions Using System Calls: Alternative Data Models," C. Warrender, et al., IEEE Symposium on Security and Privacy, 1999.

"Immunizing Computer Networks: Getting All the Machines in Your Network to Fight the Hacker Disease," S. Hofmeyr, et al., IEEE Symposium on Security and Privacy, 1999.

"Self-Nonself Discrimination in a Computer," S. Forrest, et al., IEEE Symposium on Research in Security and Privacy, 1994.

"An Immunological Approach to Change Detection: Algorithms, Analysis and Implications," P. D'haeseleer, et al., IEEE Symposium on Security and Privacy, 1996.

"An Immunological Approach to Change Detection: Theoretical Results," P. D'haeseleer, 9th IEEE Computer Security Foundation Workshop, 1996.

"Principles of a Computer Immune System," A. Somayaji, et al., New Security Paradigms Workshop, 1997.

Abstracts of Computer Immune System Project, printed Oct. 23, 2008.

* cited by examiner

FIG. 7

$\Delta t = t_{current} - t_{file\_first\_seen\_on\_network}$

| Δt=0 | Δt=12 hrs | Δt=2 days | Δt=30 days |
|---|---|---|---|
| Hash Certify | | | |
| AV Scan #1<br>AV Scan #2 | AV Scan #1<br>AV Scan #2 | AV Scan #1<br>AV Scan #2 | AV Scan #1<br>AV Scan #2 |
| AS Scan #1<br>AS Scan #2 | AS Scan #1<br>AS Scan #2 | AS Scan #1<br>AS Scan #2 | AS Scan #1<br>AS Scan #2 |
| Other Analysis #1<br>(Analyze New) | | | |
| | | Other Analysis #2<br>(Analyze Persistent) | Other Analysis #2<br>(Analyze Persistent) |

CONTENT EXTRACTOR AND ANALYSIS SYSTEM

CROSS REFERENCED TO RELATED APPLICATION

This application is related to the following applications:

U.S. patent application Ser. No. 11/194,075 filed Jul. 29, 2005, entitled "Parametric Content Control in a Network Security System;"

U.S. patent application Ser. No. 11/193,291 filed Jul. 29, 2005, entitled "Distributed Meta-Information Query in a Network;"

U.S. patent application Ser. No. 11/193,292 filed Jul. 29, 2005, entitled "Content Tracking in a Network Security System;" and U.S. patent application Ser. No. 11/193,295 filed Jul. 29, 2005, entitled "Centralized Timed Analysis in a Network Security System."

BACKGROUND

Large enterprises have large information technology (IT) security budgets and layered IT security systems, yet network compromises, damage from viruses and worms, and spyware problems are common. Current IT security technologies are expensive to maintain and do not provide protection against many new or unknown threats, while new threats are distributed, detected, and reported at increasing rates.

Security solutions which are located at the network perimeter, such as firewalls, have visibility limited to network traffic which passes directly through them. Entry vectors such as email viruses, web browser exploits, wireless access, VPN's, instant messaging, and file-sharing create an increasingly porous perimeter which bypasses these technologies. It is hard to define a perimeter in a modern network which provides sufficient control and visibility. Many attacks only generate network traffic after they have compromised a machine or network. For instance, by the time a virus starts emailing from a machine within a network, that machine is already compromised. To stop attacks before they execute, it is generally necessary to protect files, not just network traffic.

Visibility and protection can be provided by a host agent, which is software, sometimes used in conjunction with hardware, which operates on multiple individual computers, "hosts," within the network. Host agents generally work in parallel, using some of the host's resources to perform security functions in the background. By potentially having access to all significant internal functions of a host, host agents can in theory detect and stop threats on hosts before any damage is done. Host agent security systems are sometimes called Endpoint Security Systems, because they operate on the "ends" of the network.

Current enterprise endpoint security systems often attempt to detect and block attacks with known bit patterns, such as anti-virus (AV) scanning and anti-spyware (AS) scanning. Pattern scanning uses blacklists of patterns which are pre-identified as bad. Similarly, some security systems use detected known behavioral profiles, which can be described as a blacklist of bad behavioral patterns. In both cases, blacklists are perpetually out of date, unable to respond to attacks which are new or unknown. Blacklists are also ineffective against attacks such as new viruses which can spread faster than the ability to derive, test, and distribute blacklist updates. With dozens of new viruses discovered each week, blacklists of all kinds become increasingly ineffective. Behavior patterns are complex to develop and test, and as a result they have high false-alarm rates; that is, they erroneously conclude a behavior is bad when in fact it is benign. As new attacks evolve, behaviors change, leading to errors of missed detection instead. By waiting until an attack, like a virus, exhibits a bad behavior, the affected machine may be already compromised. In summary, blacklists attempt to track what is already known to be wrong, while what is wrong is constantly changing.

Another enterprise endpoint technology is anomaly detection. This can be viewed as behavioral blacklisting which is determined statistically by observing behaviors over time. In addition to inheriting the shortcomings of behavioral blacklists, anomaly detection adds new error modes as both good and bad behaviors are estimated statistically, so there are certain to be estimation errors. This process often leads to unacceptably high false-alarm and missed-detection rates.

Another class of endpoint security systems limits execution to only programs which are on whitelists, which are lists of patterns of known good programs. If a program is not included in the list, it will not run. Such a system is not flexible enough for a typical modern enterprise, and the resulting whitelists are difficult to maintain. For instance, most large enterprises deploy custom programs that are developed in-house and that can change frequently. Further, these programs may contain sensitive intellectual property and security risks which should not be exposed to a third party. It is unlikely a whitelist vendor would have access to pre-approve this software in a timely fashion. Other examples are operating system and other updates. Again, there is no central clearinghouse or central authority to certify that certain programs or updates are good for all enterprises. The failure modes of whitelist systems are severe, blocking access to critical, but not yet approved, applications and business functions.

As a result, systems which centrally classify file content access into only one or two states, Approved and Banned, will have issues with race (timing) conditions. A large amount of software does not clearly fit into either category, and there is no central authority which will be universally trusted for all software within an enterprise. Even when this is not a factor, it can take time to classify the intermediate software. In the case of a new virus, it can take 6-48 hours or more to classify a new virus as bad, and by then the outbreak can be a pandemic. So even with strong network connectivity from the host to the central approval authority, it can take longer than a few minutes to detect and analyze new software. To transparently add this content-based authorization to an operating system in the background, the delays must typically be less than one minute, or else the file system can time out, and false access-blocking errors occur.

SUMMARY

Security systems as described here allow an administrator to detect, monitor, locate, identify, and control files installed on a large network of computers. The system can provide a defense from known and unknown viruses, worms, spyware, hackers, unapproved/unwanted software (e.g. software applications which are against business use policy) and social engineering attacks. Administrators can access detailed information and statistics on new executables, scripts, and embedded scripts as they appear and propagate to networked systems. The system can implement centralized policies that allow an administrator to approve, block, quarantine, or log file activities. The system can also collect detailed information useful for diagnosing and locating problem files or attacks. The system offers visibility, control, and protection for large computer installations.

The system architecture preferably includes agent software that runs on each protected host, and a server, referred to as a "server", that provides centralized policy management, event monitoring, agent coordination and virus scanning. The server can be implemented as an appliance (which generally suggests a more limited functionality device). A single appliance can support many hosts, e.g. 10,000 hosts. A further server or appliance, sometimes referred to as a "super server," can monitor multiple appliances.

Agent software running on each protected host computer analyzes file system activity and takes action based on policies configured on the servers. In one implementation, when a host attempts to open or write a file, the agent software calculates a hash of the file's contents to uniquely identify the file to the system. The agent software uses this hash to look up the status and policies for the file. Based on this information, the agent software might block an operation, log an event, quarantine a file, or take some other specified action(s).

The system also includes many other features that can be useful in combination or individually, including the ability to extract files from archives, the ability to extract macros from files, centralized content tracking and analysis, and a "find file" function described herein.

The systems described here can use at least two additional states: Pending, which represents an intermediate, less-defined threat level, and Locally Approved, which is Approved for one host but not necessarily Approved for the central authority (and thus all other hosts). The latter permits hosts to slightly diverge from the baseline. The Pending state permits hosts to block or permit access to new content based on various threat levels and enterprise usage policies. Although using common binary approval terminology, Approved and Banned, the division of approval into 3-4 states results in different improved capabilities for each individual state. Generally, software which is new and which has not been classified yet is Pending. Traditional binary access states for software (ban/approve) are not flexible enough, and such classification systems are not as scalable.

The designation of software as new/Pending is useful. Most enterprises have a "no new executable" policy in some form, such as "employees are not permitted to download and run unapproved software from the Internet." And yet, enterprises cannot detect new software as it propagates, until it is too late, do not know when their policies are being violated, and have no means to effectively enforce their policies. By tracking new programs as Pending while they are being modified/written to the file system, a host agent can detect and report new content, in real-time, as it enters the network from almost any means, whether email, instant messenger, download, USB key, mobile laptop, etc. By identifying programs as Pending, some simple, scalable, effective policies are possible, such as: "Permit, but warn when hosts run new executables" or "No new unapproved programs can be installed or run by this group of hosts" or "Warn when the same new unapproved program appears on more than N hosts within 24 hours". Thus, new programs can be safely located, tracked, and analyzed while being blocked. Other approved business software will continue to run. New approved software can be installed and run, such as AV updates or security patches. This approach is a proactive response, protecting against unknown possibly malicious software while permitting productivity, and gaining analysis time while not requiring any time-critical blacklist or whitelist updates.

Existing file whitelist and blacklist systems tend to be global in nature, since maintaining many separate lists centrally, one for each host, is difficult. As described here, hosts can maintain their own lists, which may diverge from the central lists. In particular, this can be the case with Local Approve and Pending states, and it is often true with name-based states, such as NameBan and NameApprove. Since "name" is generally a local property, these states can diverge from the centrally controlled states. For example, if a file "foo" has a certain hash=x and a central server state Pending, on a host the file could be Local Approved or Name-Banned or Name-Approved, the latter two depending on the local name of the file on the host. The systems described here permit efficient management and policy implementation of thousands of name properties simultaneously applied to every file on every host. NameApprove permits flexible local approval and central approval capabilities, based on where files are created on the host. In conjunction with host groups, this permits accurate flexible efficient specification of where and on which hosts new content is approved.

Even with this new flexible policy system, enterprises usually need to enforce different policies for different roles and situations. For instance, IT administrators and internal software developers may need to carefully run new software, while other employees require only a small standard suite of relatively static applications. This situation could change quickly when under attack. For instance, if a virus is detected on more than N hosts, it may make sense to expand the scope of the "no new executable" policy. This flexibility and incremental response is an advantage of a "Parametric Content Control" system described here, compared to rigid systems that cannot adapt to varying policies within and enterprise and over different conditions. "Parametric Content Control" permits a flexible lockdown mode which can be centrally managed and quickly varied based on network and host conditions. And this permits incremental file content and/or file name-based restrictions and approvals.

Unlike other endpoint security technologies which process host user credentials, process identifiers, data source (URL), directory structures, and operating system security descriptors, the systems described here do not need to utilize these factors as part of host policy. On a host, these factors can be unreliable and can be vulnerable to compromise, and they can hinder scalability. These factors result in less scalable policies, as fine-grained policies can interact across a variety of hosts in complex ways. Even if the operating system is compromised, and an attack gains admin privileges and all associated security descriptors, a "no new executable" policy as described here will provide substantial protection.

The "Content Tracking" system utilizes additional states such as Pending to monitor and analyze new content as it moves through the network. Current technologies do not permit global central visibility and tracking of every new executable file, across a large number of hosts, in real-time. Endpoint systems relying on file system scanning, like AV scanners, and host application inventorying like Tripwire, periodically and slowly crawl through large file systems looking for new or changed software. This is typically disruptive to the host, can take hours, and is normally scheduled at most once per day. By focusing on what is new, and storing that information in memory, the Content Tracking system is more scalable and responsive. Since it is rare that new software arrives that has never been seen by any host in a large group N, and it is rarer that many hosts M have that new software appear in a short period of time, reports, response, and analysis are facilitated by this distinction.

Once new software is detected, it can be useful to locate and identify it in a timely fashion. If some new software turns out to be a new attack and is spreading, it is desirable to respond very quickly. Again, current technologies can locate single new files on single hosts on a network, on a timescale of several minutes to hours. Even on a single host, finding a very new file by name or content can take 15-60 minutes, and it will negatively impact the disk performance of the host while the query is being processed. Over the past 20 years, hard disks have gotten much larger in byte storage capacity but have not increased proportionately in speed. The "Distributed Meta-Information Query" feature accelerates the location and identification of key file attributes in seconds, across large numbers of hosts (thousands), with centrally specified queries, centrally reported results, with little or no host disk impact. Unlike traditional tracking technologies which track all files, including those which have not changed, the invention here tracks file changes in memory as the files are changing, and this provides an efficient means to query hosts for file meta-information from memory. Centrally processing this information provides, for the first time, responsive global views of the movement of individual files throughout collections of host file systems. Finally, as a security service, it is important that the hosts connect to, post to, and query from the central server. This is an important part of the invention in that it permits hosts to be separated from servers by one or more firewalls or NAT devices, and the difficult problem of securing an additional host network socket in accept/listen mode is avoided.

Current endpoint host agent systems that use content analysis have issues with updating host agents. For example, for AV scanners to be most effective, they should be updated within hours or minutes of an update being made available. Any hosts with AV which lags are at risk, and many AV systems are improperly configured, resulting in update lag. Because they do not efficiently track file changes, AV scanners typically take a relatively long time to respond to new content written to a file system. Also, current host content analysis technologies needlessly re-analyze files without taking security factors into account. For instance, it is more important to analyze new content more often, the newer it is. If a file has been completely unchanged in the network for 2 years, it likely does not need to be scanned every ten minutes. However, if a new file is spreading through a network starting ten minutes ago, then scanning the new file often the first two days can make sense. There is generally less and less new information about new malicious executable files as time progresses. The "Centralized Timed Analysis" feature addresses these issues. Only one analysis agent needs to be updated, the central one, and all hosts immediately benefit. There is less chance a host configuration can interfere with content analysis updates. By tracking only new files and by scheduling analysis based on age (time) exposed to the network, new bad content can be located and identified efficiently and more quickly. Finally, many endpoint content analysis technologies, like AV, are tightly integrated with the operating system. As a result, it can be difficult to put several content inspection agents from different vendors on one host. Diversification of analysis technologies improves detection and classification accuracy. Again, the invention solves this problem by using a central server to dispatch analyses to different servers, if necessary.

Executable content (exe files) and embedded macros (macros embedded within Microsoft Office documents) tend to propagate in clusters or groups. A word processing document might contain 10 macros, and be over 30 MB in size, yet the macros only occupy a fraction of that space. A large installation package can be hundreds of MB in size, and yet the executable portions of its internal archives typically occupy a small portion of total size. Viruses often travel through email as archive attachments, such as zip files, to avoid detection. Inside these archives, the virus payload may be small. For all of these cases, larger "container" files can obscure the propagation of possibly unwanted new code. The "Content Extractor" feature addresses a variety of current limitations by preserving the (nested) container relationships, and simultaneously facilitates: tracking of content, tracking of similar containers, tracking product associations, minimizing unnecessary reanalysis, minimizing file transfer bandwidth, and preserving compatibility with other analysis technologies by repackaging content as other known file types. The central storing and tracking of new content, and the central scheduling of analyses relative to the first appearance time of content, provide powerful advantages in terms of security, global visibility, enterprise management system integration, and future expansion.

While the systems described here have been distinguished from other systems, such distinctions are not meant to disclaim coverage of the claims to these systems. The systems and features described here can be provided as a group or separately, and in many cases, can be integrated into prior and known systems, including those identified above.

Other features and advantages will become apparent from the following drawings, detailed description, and claims.

BRIEF DESCRIPTION OF THE DRAWINGS

FIG. 7 is a flow chart of steps performed during a timed analysis.

DETAILED DESCRIPTION

Figure 1:
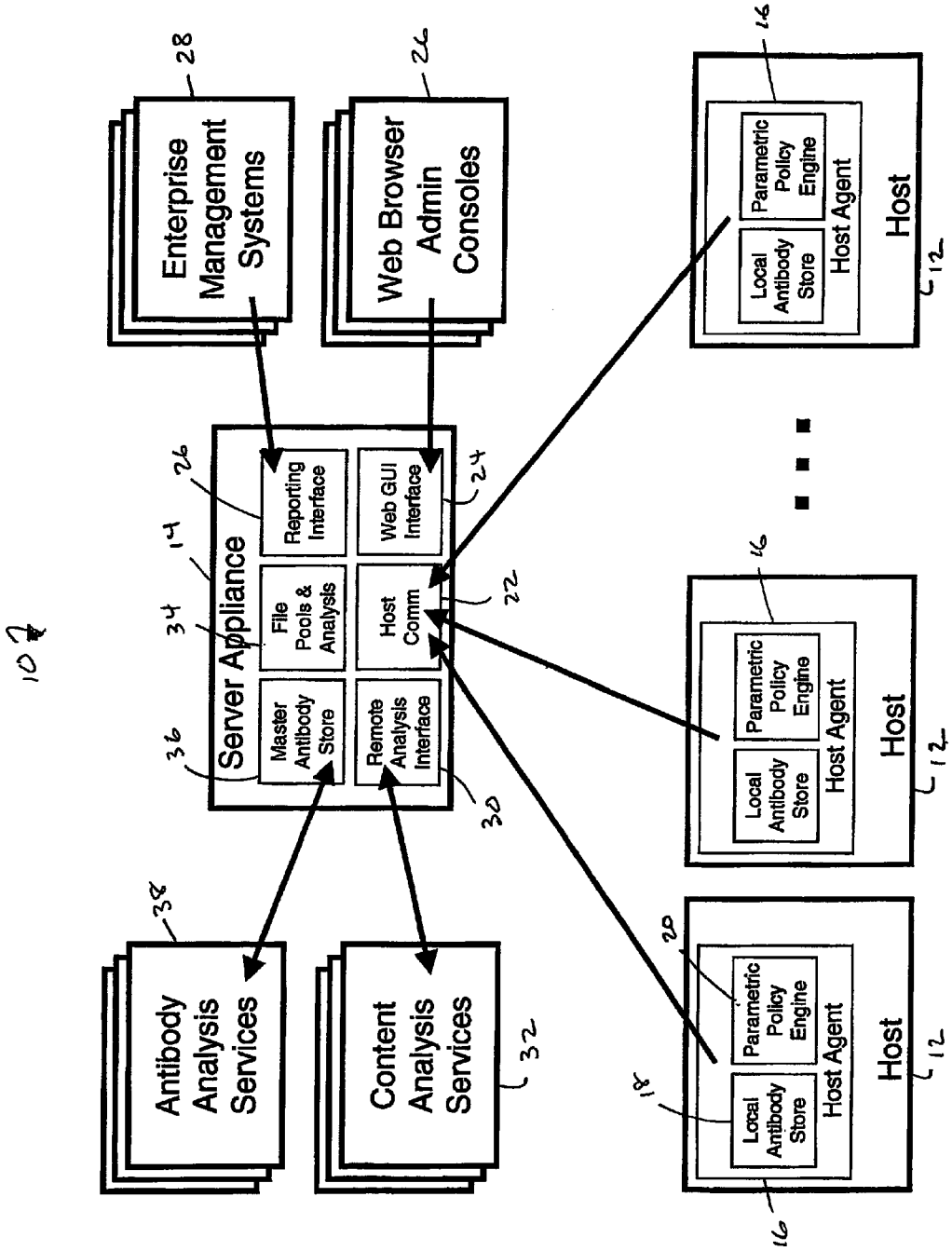
FIG. 1 is a block diagram showing an overview of a security system as described herein.

Referring to FIG. 1, a system, also referred to as a digital antibody system (DAS) 10, allows an administrator to monitor, understand, and control files installed on a large network of computers, and can provide a defense from known and unknown viruses, worms, spyware, hackers, and social engineering attacks, as well as unapproved software (e.g., file sharing software not for business use). The system includes one or more servers, one of which is shown here as server 14 (appliance). This server provides centralized policy management, event monitoring, agent coordination, and content analysis (e.g., spyware and virus scanning). A single server can support many hosts 12, e.g., hundreds or thousands of hosts. The server also maintains a database of metadata relating to analyses, such as scan histories and approval states, with respect to files and programs. This metadata is referred to as an "antibody" for each of the files and programs.

Each protected host 12 has a host agent 16, preferably implemented as software. It analyzes file system activity and takes action based on policies configured on a server. These policies, described in more detail below, identify whether to block, log, allow, or quarantine actions such as file accesses and execution of executables. Each host agent 16 has a local "antibody" store 16, which is a cache of meta-information relating to files, and a parametric policy engine 20 for implementing policies from server 14.

Server 14 has a number of functions and interfaces. The interfaces include host communications interface 22 for communication with the hosts, a web-based graphical user interface (GUI) for communicating with web browser administrative consoles 26, a reporting interface 26 for serving as an interface to enterprise management systems 28, and a remote analysis interface 30 for communicating with content analysis services 32 (e.g., virus and spyware scanners). Server 14 also includes an analysis block 34 and a master antibody store 36 that communicates with antibody analysis services 38 and that stores a master list of antibodies for the associated hosts. Services 38 can include an off-site certification authority with additional information associated with the antibodies, e.g., classification of an antibody as a member of a certain product package such as Microsoft Office.

Figure 2:
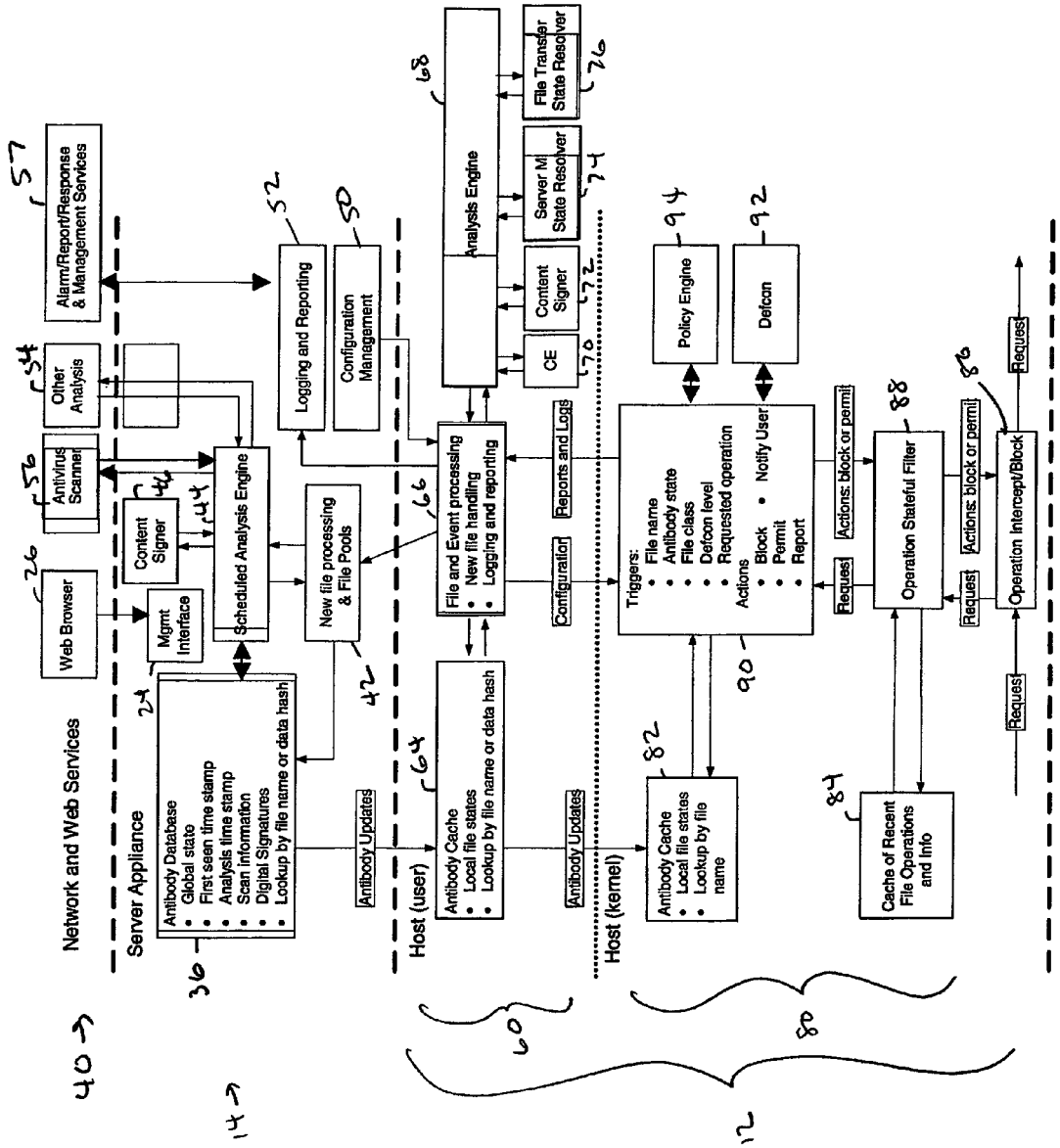
FIG. 2 is a much more detailed block diagram showing components of the system in FIG. 1.

FIG. 2 shows an expanded view of the system and its components including the server 14, host 12 with user and kernel portions, and other network and web services 40. As shown here, the server includes a new file processing and file pools block 42, which includes copies of recent files which have appeared on the network, a scheduled analysis engine 44 for identifying files and hashes which are to be analyzed, a content signer 46 for creating a cryptographic hash of contents using algorithms such as MD5 and SHA-1, master antibody store 36, configuration management 50, and logging and reporting 52. The server interacts with network and web services 40 including analyses 54, AV (or other content) scanner 56, and management services 57.

The user portion 60 of host 12 has an antibody cache 64 for holding updates from database 34 by both name and data, file and event processing 66, an analysis engine 68, a content extractor 70 for extracting content of interest and associating groups of individual content in a package, a content signer 72 for creating a cryptographic hash of the contents, server meta-information (MI) state resolver 74 for checking antibody cache 64 for the antibody and checking the server for the antibody, and file state resolver 76 for checking the progress of content uploads to the server and checking the server for certification of the upload.

The kernel portion 80 of host 12 has cache 82 for saving antibodies organized by file name, and a cache 84 of recent file operations and file information. The kernel also has an intercept/block function 86 that receives and intercepts file operation requests, and provides these requests to a stateful filter 88 that first checks the cache of recent file operations 84. If there is no match, it checks the triggers and actions block 90 which maintains security policies. This block 90 is coupled to a "defcon" block 92, which has a value that indicates a security level for the system, and policy engine 94 that governs blocks 82, 90, and 92 for controlling various file operations including executions, file reads, file writes, and other actions. The triggers and actions block 90 communicates with antibody cache 82 that looks for meta-information on files based on their names. Policy engine 94 also controls actions, such as blocking, reporting, or allowing file operations, and reporting to the user.

The system includes numerous methods and aspects for using this security system, many of which can be used alone or in combination with others. These methods and aspects are described in more detail below.

One aspect is the use of a centralized scan to check documents or executables and to maintain a hash indicating whether that data has previously been checked. The hash values can be stored in a database and also cached in local hosts.

Another aspect is in the use of a centrally set parameter, sometimes denoted "D" or "Defcon", that controls the policies of the hosts. This central policy and parameter can be applied to all hosts, or to selected groups of hosts. The parameter can be set manually by an operator or can be adjusted by the system without human intervention, typically in response to some event. The policies can include blocking or allowing certain actions, or it can make an action pending, which makes it allowed, subject to further monitoring such as logging. A pending status has multiple benefits, including taking into account latencies in the system, as well as implementing policies which do not fit the traditional binary approve/ban model. These latencies include the time before harmful code is identified, during malfunctions in the system, or times when a host is disconnected from the network.

In still another aspect, a central server can specify a query of meta-information and distribute that query to all or a selected group of hosts. These hosts perform the query from a local store of meta-information and send results back to the server that can cause the server to adjust the parameter.

In yet another aspect, the system includes a method for protecting against spreading macro viruses that can be embedded within other documents. This functionality can be used with Visual Basic macros, but the methods could apply to any other macro language other than Visual Basic.

In another aspect, all copies of new files are kept in a special directory in a server 42. Further analysis can be performed based on timers, and could be performed days after the file is first seen. After some period of time from the first appearance of a file, such as 30 days, the file can be rescanned for viruses, spy ware, or other problems, and can the system can take action depending on the results. For example, an analysis which indicates a virus is contained in a file would then cause the corresponding Antibody Database 36 entry for this file to include a Banned state. This change, along with other Antibody Database changes, will be propagated to the Hosts.

Centrally Set Parameter and Parametric Content Policy

The security in the system is based on policies that are defined in each server and propagated to all the associated hosts or groups of hosts, through push and/or pull techniques. These policies relate to what can be done with executables and files, such as reading, executing, and writing, what to do when they are created or altered by hosts, how scans are run, how logging is done, and many other functions, and for each policy (e.g., what operations can be done with a newly seen executable) there can be a number of policy options (such as ban, allow, or allow and log). The policies can be based on the content (data) in a file or the name of the file, or a combination. The content can be defined by a signature, such as one or more cryptographic hashes. A non-exclusive list of sample policies includes:

1. Block/log execution of new executables and detached scripts (e.g., *.exe or *.bat)
2. Block/log reading/execution of new embedded content (e.g., macros in *.doc)
3. Block/log installation/modification of Web content (alteration of content in *.html or *.cgi files)
4. Permit updates for policies such as (3) above
5. Auto approve files that pass two virus scans (e.g., set the corresponding file state to Approved)
6. Block/log installation/execution of files specifically banned by administrator
7. Quarantine/delete/log infected files by data
8. Quarantine/log infected files by name
9. Block/log execution of new files in an administratively defined "class"; e.g., an administrator might want to block screen savers *.scr, but not the entire class of executables *.exe, *.dll, *.sys, etc. . . .
10. Log when specified files are copied to removable media 11. Block/log execution of new executables, scripts, and embedded content, except in a certain directory i.e., allow a user to create new scripts or executable in a special directory but protect the rest of the file system
12. Different policies for hosts when offline, remotely connected or locally connected
13. List hosts/paths that contain a specific file by data or by name
14. List hosts with blocked executables, scripts, and embedded scripts
15. List hosts/paths with infected or banned files
16. Auto-approve files from defined update services, e.g., if from trusted sources
17. Block/log execution of files specifically banned by administrator for specific host groups (i.e., there is more then one group)
18. Completely deactivate the host system for performance reasons and testing.
19. Auto-approve a file after a period of time (user configurable)
20. Allow a new file to be installed/executed up to x times (user configurable). Block any more installations and/or executions until approved.
21. Locally Approve new files as they are written
22. Centrally Approve new files as they are written The server can maintain one or more policies for each host group, and each policy is variably enforced according to a parameter that is centrally set and that indicates options for the policies. These policies and options can be logically organized as a two-dimensional array, where the parameter in effect moves along one dimension to select the policy options for various policies. This parameter is referred to here as a D value. All hosts can have one value for D, or logical subgroups of hosts have their own value of D; e.g., hosts in the sales department could be assigned D=1 and hosts in the marketing department could simultaneously be assigned D=2. In one implementation, hosts check (poll) the server to see if the value of D has changed. As each host discovers that D has changed, they each begin to "move" to the new value of D. This movement can be done in steps. These polls can be provided as network messages from the hosts to the server. The D value controls policy actions. For a given policy (e.g. "No New Executables" or "No New Scripts"), D=2 blocks policy violating actions (in this case, the execution of a "new executable"), D=4 warns (silent alarm to server) but permits, and D=6 permits and does not warn at all. Regardless of whether D=2, 4, or 6, the hosts preferably continue to notice and record new executables as they are written. While the examples here use a numeric value for D, D can have a "value" that is expressed in letters, words, or any combination of letters and numerals.

The D value also controls policy activation. For a given policy (e.g. "No New Executables" or "No New Scripts"), D=1 enables a "write protection" policy, so new executables can not be written at all, while D=8 completely disables all policies, and the D=2, 4, and 6 cases can be as set out above. In this case, D=8 can even disable the policy of noticing when new executables are written to the file system.

While the value of D can be set centrally in a server, it is implemented locally on a host. It can be set by an administrator through a graphical user interface (GUI) on an administrative console by using a browser connected to a server, or via Simple Network Management Protocol (SNMP). The D values are considered "target" values; hosts attempt to move as close as they can to this value, which may take seconds or minutes. In some cases, a host can diverge locally from the target value as specified by the server. A command-line program can be invoked on the host, or the user can be prompted for certain values of D, and the target value of D can be overridden. This feature can be useful, for example, in cases where an individual's machine needs to have the security disabled (D=8) and there is no network connectivity with the server. Certain actions can automatically change the value of D on a host, such as detection of an update from an authorized program (e.g., antivirus update).

The policies reflect a tradeoff between security and usability. In the examples above, D=8 is maximally useful, and minimally secure—no policies are activated, and the host agents are effectively disabled from blocking and tracking. As D moves toward maximal security (D=1), more and more restrictive policies are activated, and the actions performed when the policies are violated become more and more severe. Ordered states are desirable in that they are easier to visualize and test (generally, one can just test the endpoints need be tested, such as D=1 and D=8). With ordered states the numbers of files and users become successively more accessible or more restrictive as the value is increased or decreased. These ordered states naturally reflect tradeoffs between security and usability.

As D is changed on a live system, race conditions can occur. The basic problem is that an installation of multiple files could become "half-blocked" or "half-installed" if a value of D were to be changed from 8→1 while installing a program. As a result, certain D transitions can trigger file antibody state reanalysis and file antibody bulk state transformations.

Local D changes can sometimes be caused by local policy triggers. Normally, D is set centrally on the server. But sometimes, a local host policy is triggered, which then causes the local host D value to change. This is useful, for example, to complete an install on a locked system (D=2). Continuing this example, installing printer drivers at D=2 could otherwise result in problems, because some of the unpacked new install files need to execute to complete the installation. Further, different host machines may need to unpack and execute different programs to complete the installation (e.g., Windows 2000 and Windows XP). In this case, execution of a certain antibody file type, an approved program "printer setup.exe", will move that host's local D from 2→3, which is a slightly weaker state that automatically locally approves only these new installation files and their progeny.

The D value could be changed depending on the type of connectivity, whether local (on a wired LAN), remote such as through a telephone modem or virtual private network (VPN), or completely disconnected. The host agent would thus store a set of specified D values for these types of connectivity and then automatically select from the set in response to a change, for example, when a user disconnected the host from the LAN. Also, different D values can result in decreases or increases in reporting, logging, and tracking detail.

Policies can also be set from a central server, referred to sometimes as a "super server," which can control many servers/servers. Assuming each server controlled 2,000 hosts, and there were 1000 super-servers, it is unlikely that a super server command to set D=1 would be proper for all 2,000,000 hosts. Instead, the super server could command all servers and hosts to have as strong a D as locally permitted. So some servers, and their connected hosts, would go to their limit of, e.g., D=2. Other servers might go to D=1, but then perhaps some of their host groups would be limited to D=4, so those hosts would go as strong, but no stronger, than D=4. The same limiting is true for the other end of the spectrum. If the super server commands D=8, some servers and hosts might only go to D=6 instead. Since D is an ordered state, these constraints are simple integer ranges (maximums and minimums).

The value of D can change based on the detection of some event, such as spreading files. If too many copies of a new file are propagating among a server's hosts, the server can optionally increase D to stop the spread (e.g., go to D=2). This event can be specified as too many of a certain name (e.g., a top 10 list by name) or too many by unique contents (e.g., top 10 list by a hash of data).

The value can also be changed per server request in response to a new event perceived by the server, such as a new incoming file or a potential virus attack. In most cases, it is the administrator (a person) who initiates the change of D, following planned user operation, or on observation of certain file events. D can be automatically changed, e.g., during the process of an operation, in which case, the host/server will roll the value of D back to its original level after the operation is terminated. External triggers can change the value of D, such as SNMP.

Another response is for the server to automatically approve content that is on fewer than a certain threshold number of hosts, yet automatically ban access to that content when the number of hosts is exceeded. Such a policy could be used to limit the number of copies of any content or file in the network. Also, such a policy could be used to only report content that exceed the certain number of hosts.

Servers can maintain a policy set separately for each logical group of hosts, such as sales hosts, marketing hosts, and engineering hosts. Policy sets can have unique identification numbers that are similar to antibody version numbers. The difference is that, once deployed, a policy set becomes "read only" to reconcile later problems with a policy set and to undo a problem deployment. This can also be done to difference configuration and other updates, using technology similar to the Unix utilities "diff" and "patch." Hosts can query the server for the current policy set ID number for their group, and if there is a mismatch, they can send the server a "GetPolicySet" query.

A policy set can include multiple policies, such as a "New Executables" policy and a "New Script" policy. Each policy can be in active (on), inactive (off), or in test mode (where blocks are permitted but a "would have blocked" message is sent to the server). Each policy can have multiple rules, each rule with a basic "trigger and action" model. Triggers are patterns which are tested. If the pattern matches, the resulting actions are performed. For example, "blocking execution of new executables at D=2" could be specified as follows:

Trigger=(D=2 & FileOp=Execute & State=Pending & FileExtensionClass=ExecutableClass) where ExecutableClass=(*.exe|*.sys|*.dll| . . . )

Action=(Block & Report & Notify(P)) where "Block" stops the operation, "Report" sends notification to the server, and "Notify" alerts the user with parameter set P.

With this structure, the kernel can enforce all policies without interaction with user space, except in the case of kernel antibody cache updates, D updates, and policy set updates. Policy sets need only be stored in one place, and they need only be interpreted in the kernel in this implementation. Policy sets can be authenticated and stored in one secure context (the kernel), resulting in more security against tampering.

Policies and actions are parameterized by D since D permits different rules to match different triggers. Files with certain states may have certain operations blocked. These states can be a combination of name and data properties. These states are determined in user space, mirrored in kernel space, and ultimately, the states are determined by the server. One useful policy is to block banned files, and at some D values, to block file executions of pending (new) files.

The policies can be provided as a set of lists of policies over a range with tradeoffs of accessibility and security. The server can then provide information to cause the hosts to select one of the lists. By having the lists present at the hosts and allowing the hosts to update policies using the "pull" approach, the hosts can conveniently update security policies under control of the server.

The following table shows an example of how the D value can affect various policies in a master policy set, where the rows are policies in the master set, the columns are actions, and the cells have numeric ranges of D for indicating the actions. The actions specified in the table and other details are summarized below:

| | D Value vs Policy Name | | | | | | |
|---|---|---|---|---|---|---|---|
| | D = 10 Global Approval | D = 8 Protection Disabled | D = 6 Tracking Only | D = 4 Silent Alarm | D = 3 Local Approval | D = 2 Lockdown | D = 1 Write Protect |
| New/Pending Executables *.exe, *.sys, . . . | Auto Global Approve New, Report | Permit | Permit | Permit execution, Report | Auto Local Approve New, Report | Block Execution, Notify, Report | Block Write/Exec, Notify, Report |
| New/Pending Standalone Scripts *.vbs, *.bat, . . . | Auto Global Approve New, Report | Permit | Permit | Permit execution, Report | Auto Local Approve New, Report | Block Execution, Notify, Report | Block Write/Exec, Notify, Report |
| New/Pending Embedded Scripts In *.doc, *.xls, . . . | Auto Global Approve New, Report | Permit | Permit | Permit execution, Report | Auto Local Approve New, Report | Block Execution, Notify, Report | Block Write/Exec, Notify, Report |
| New Web Content *.html, *.asp, . . . | Auto Global Approve New, Report | Permit | Permit | Permit Writes, Report | Permit Writes, Report | Write Protect, Report | Write Protect, Report |
| Approved (hash and/or name) | Permit | Permit | Permit | Permit | Permit | Permit | Permit |

-continued

| D Value vs Policy Name | | | | | | |
|---|---|---|---|---|---|---|
| D = 10 Global Approval | D = 8 Protection Disabled | D = 6 Tracking Only | D = 4 Silent Alarm | D = 3 Local Approval | D = 2 Lockdown | D = 1 Write Protect |
| Exes/Scripts/Embed Banned/Unapproved (by hash) Exes/Scripts/Embed | | | | | | |
| Permit | Permit | Block Execution, Notify, Report | Block Execution, Notify, Report | Block Execution, Notify, Report | Block Execution, Notify, Report | Block Execution, Notify, Report |
| Banned/Unapproved (by name) Exes/Scripts/Embed | | | | | | |
| Permit | Permit | Block Execution, Notify, Report | Block Execution, Notify, Report | Block Execution, Notify, Report | Block Execution, Notify, Report | Block Execution, Notify, Report |
| Content change and Content creation tracking | | | | | | |
| Track, Report | Permit | Track, Report | Track, Report | Track, Report | Track, Report | Track, Report |

(1) Permit: Permit the operation, otherwise silent
(2) Block: Block the operation, otherwise silent
(3) Track: Track the operation and resulting content (if content is Pending or Banned), otherwise silent. Approved content is generally not tracked.
(4) Report: Send a notification to the server
(5) Notify: Indicate to the host endpoint user why the operation was blocked/interrupted
(6) Auto Local Approve: New host files and/or new content with local host state=Pending are locally set to host state=Approved or state=LocallyApproved only on the local host as the files/content are created/modified.
(7) Auto Global Approve: New host files and/or new content with local state=Pending are globally set to server state=Approved on the server as the files/content are created/modified.

Antibody Introduction, File Meta-Information

Referring particularly to FIG. 2, for actions that are allowed, the server in the system includes an antibody database 36 that is used primarily to keep track of file scan histories and the approval states for each of the files. An antibody is a block of data about a file (i.e., metadata or meta-information) that can include some or all of the following fields:

Time First Seen. When the file or hash was first seen by the hosts and reported to the server.
File ID. A unique identifier for the file, including one or more hashes of content such as MD5, SHA-1, and OMAC.
File Type. The file class (e.g. executable, script, office document, archive, etc.). This is derived from the file name as it was first seen (see below) and also from analysis of file contents.
Status/State. The current file status, including Approved, Pending, or Banned.
Method. The way in which the server learned about the file (automatically, manually, etc.).
Filename. The name of the file, as first seen and reported to the server. This may not be the file's current name, but is just the name of the first instance seen on the network.
File Path. The path of the file, as first seen and reported to the server.
Host file name/path/extension when first seen/reported
Host file name/path/extension when last seen/reported
Host IP address file first seen/reported
First Seen Host. The name of the host on which the file or hash was first seen and reported.
Analysis Results. The result of the latest scans or other analyses.
First Analysis. The time of the first scan/analysis of the file.
Last Analysis. The time the file was last scanned/analyzed.
Last Updated. The time the file state was last modified.
Parent Containers. Links to other files which have been associated with the file.
Parent Container Attributes. File name, first seen time, first seen host, file path, product classifications, and state of one associated container file.
Root Containers. Links to other files which have been associated with the file. A root container is one which is not contained in another container.
Root Container Attributes. File name, first seen time, first seen host, file path, product classifications, and state of one associated root container file.
Reference parent file containers, if known. These are used to maintain containing associations such as: "file of this hash=y was observed inside an archive file of hash=x".
File content type (determined by content analysis) such as executable, script file, embedded macro The server has the system's complete set of antibodies for the system. While each host can contain a local subset of the antibodies in user cache 64 and in kernel cache 82, the server is the authority for setting and changing to certain states. For example, the server is the authority that centrally initiates and propagates changes (to Hosts) including state transitions from Pending to Approved or Banned (those three states preferably associated with content hash), while hosts are the only authority that can set a state to locally approved. Each entry in database 36 is persistent and preferably is easily accessible with a file data hash index. The database can optionally be indexed by other keys, such as file name, date first seen, state, analysis results, host ID, or host count, so that an administrator can easily browse the antibody database.

While the database with antibodies is described as being in or on the server, it should be understood that this means that the database is associated with the server. It could reside physically in the same box and the server's processing functionality, or it could reside in a different box or even in a remote location. If remote, there should be suitable wired or wireless connection to obtain the data.

Antibody (AB) Tracking Introduction

As new files are created or existing files are modified, tracking policies may be triggered, thereby setting off a chain of file and antibody analysis events. First, the host performs a series of steps to determine if there has been a significant modification to content that corresponds to content that has already been analyzed and for which an antibody has already been stored in a host cache. If the content antibody is not in the host cache, the server is queried to determine if the server has already analyzed the content. If the server does not have a corresponding antibody, then the content may be uploaded to the server for further analyses. Until the server can determine the state definitively, the state associated with the content is set to be pending or not yet determined. Subsequent access to pending content may be limited. The server performs analyses on the content based on a time since the content was first seen on the server. Based on the analyses or on other external determinations, the server may definitively determine changes in the state. These changes may be indicated for later retrieval by the hosts so the hosts can update their antibody caches with the changed states.

Host Antibody Tracking

Figure 3:
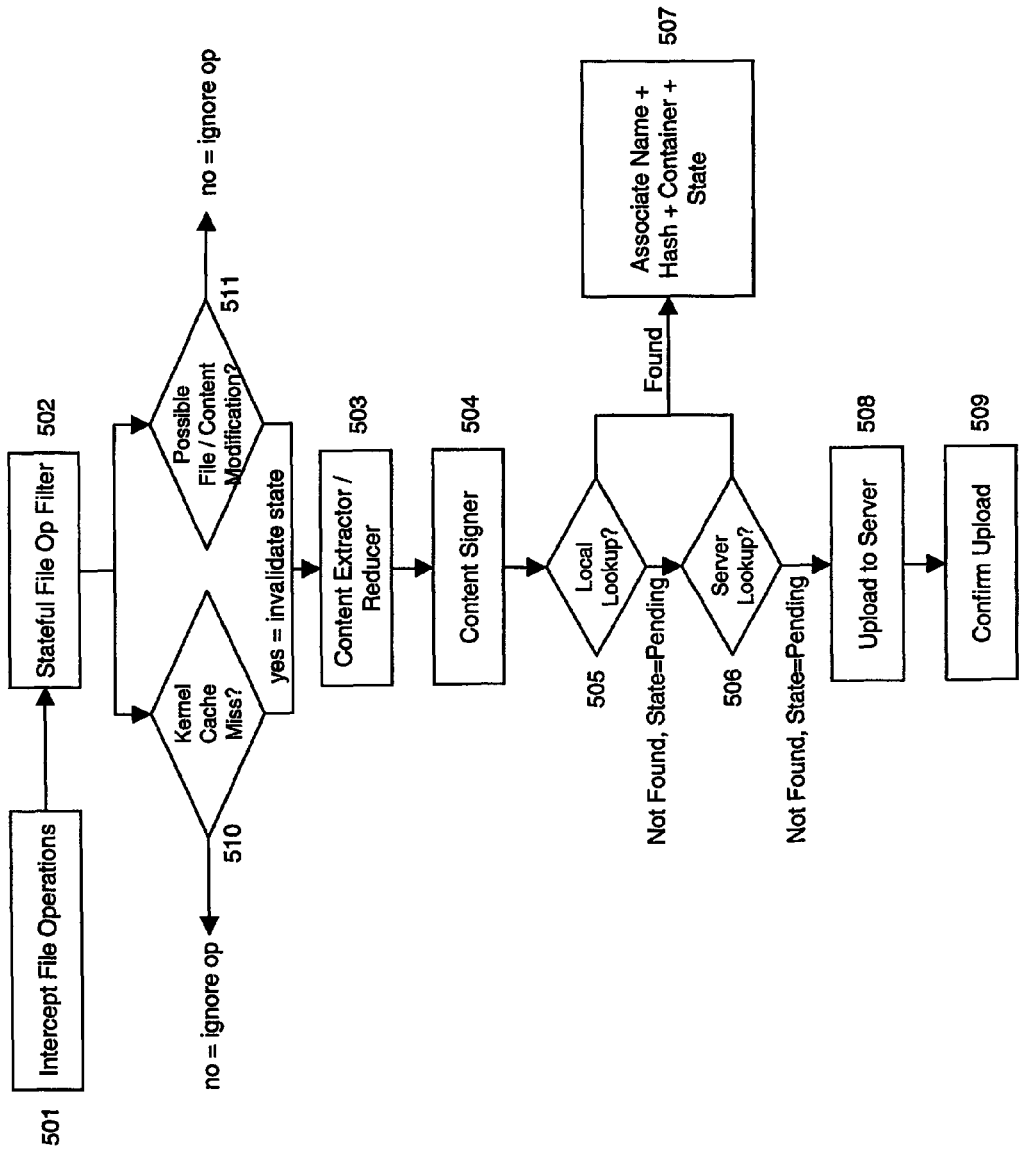
FIG. 3 is a flow chart illustrating a process for performing an analysis.

Referring to FIG. 3, the host intercepts file operations (501), including execute, read, rename, or write, and provides the operation to a stateful file operation filter (502). If the file name is not in the kernel cache and there is a kernel cache miss (510) and if there has been a possible file or content modification (511), the state is invalidated. The file then goes to a content extractor, which, as described in more detail below, extracts the active content of interest (503) to produce a reduced file, and provides the reduced file to a content signer (504). The content signer applies a cryptographic hash, such as MD5, to the reduced file. This hash is associated with the file and the file name. A file operation may be delayed/stalled while the hash and other analyses (cache miss resolution) are completed.

The host also makes a local lookup based on the hash content to try to get a state (505). If the content and a state are not found, the state is sent to pending. This can mean that the file operation is allowed to proceed, although further monitoring, such as logging, could occur also. If the content is found, the name, content, container (file which contained the active content) and state are all associated together (507). If not, the host requests that the server look up the content in its memory (506). If found there, the name, content, container (file containing the active content) and state are all associated together (507). If the content and state are not found, the state is set to pending, and the content is uploaded to the server (508), which confirms the upload (509). The server can also look to a "super server" associated with a number of the servers. Container relationships are stored and associated with files and other containers. Container information is also sent to servers and hosts, as well as sent for analysis. A "Root Container" is a container which is not contained by another container. Containers are identified by their associated files as well as by cryptographic hashes.

Generally, antibody states are assigned to a hash or signature of the "active" parts of file contents or of entire file contents. So generally, HASH(File Data/Contents)→State. This maps Data→State. State (S) can contain many pieces of information, such as "approved" (white list) or "banned" (black list) or "pending" (a "grey list" such as a newly seen file that has not been fully analyzed yet).

An advantage of this system is the combination of name states with content states. For instance, the server can specify and store multiple name bans, such as *msblast.exe. The server stores name state policies as lists of regular expressions and associated meta-information. Any file drive/path/name/ext which matches the regular expression will then inherit the name meta-information. This information is updated whenever file names are changed or the name meta-information specification changes. Name states and policies are propagated from the server to the hosts. For example, by adding *msblast.exe→NameBan, the server will sense the new policy/state, and will propagate that specification to the hosts.

Hosts will then search their name meta-information caches for matches with *msblast.exe, and those file which match will inherit NameBan state. Host file state is a superposition of name and data states: for example, if temp_msblast.exe had content state=Pending, its combined state is Banned since NameBan has precedence over Pending. Name approval states are handled in a similar fashion.

Antibodies are stored in the databases hierarchically. There are four main storage locations for antibodies as indicated above. In a host agent, a kernel antibody cache 82 maps file NAME→antibody STATE. For example, NAME=c:\windows\bar.exe→STATE=approved. In shorthand, this mapping is N→S. The kernel can and does enforce policy based on the state without needing access to file contents. This is useful as the file may be encrypted in the kernel but visible in unencrypted form higher up. The kernel has direct access to the name, but not to the hash. The kernel cache can be weakly consistent with other caches, and ultimately the server, in that there can be long latencies (seconds, minutes, hours, days).

The host agent has a user antibody name cache (UN) and a user antibody data cache (UD) 60. The UN maps the file name to a hash of the file contents (Data), i.e., UN maps N→Data. And similarly, the UD maps data to state Data→S. Generally, the mapping of N→Data is many-to-one, and UN mirrors the structure of the local file system. The mapping of Data→S is generally one-to-one, as hash collisions are rare with strong hashes that are preferably used, such as MD5. The UN and UD caches are also weakly consistent with the server, but both UN and UD are strongly consistent with the local host file system, as is the kernel cache. UN and UD can be combined as follows: N→Data→S=N→S.

A server has an antibody database 34 of generally every unique hash that has ever been reported by any of its hosts, and a super server (if there is one) has an antibody database of generally every unique hash which has been seen on any of its servers. Limiting to unique hashes limits storage and processing, although more could be stored with further improvements in storage and processing. Also, limiting to unique hashes results in more efficient analysis and lower network traffic.

Generally, new files propagate from the host to the server to super server in response to "New File" or "Dirty File" events, and the newly computed antibody state propagates in reverse from super server to server to host user to host kernel in the form of antibody updates. In this way, antibodies are centrally controlled, managed, and verified. The servers "own" and certify the antibodies and servers provide authentication that the antibodies have not been altered or forged. Hosts maintain their own antibodies which generally but do not necessarily correspond to those on the server. So a compromised or malfunctioning host cannot degrade a server or super server antibody collection, nor can a compromised host degrade the antibodies of other hosts.

On the host, the antibody state is preferably stored so that it is not associated with hash/data, but rather by name. The kernel parses, interprets, and enforces policy, and the state of a file is looked up by name. It is understood that the preferred implementation enforces policy in the kernel, but other implementations can enforce policy in user space. When looking up state, in either user space or kernel, it is actually a mixture which determines the resulting state. For instance, if the data antibody for foo.exe is pending, but the name antibody was banned based on its name, then the GetABState (foo.exe) returns a result of "banned by name". There is a separate policy to block executions of files with antibody State=NameBan. The actions for that policy are parameterized by the value of D as above. One difference is that policies which block "Banned by Name" are active at lower D security settings. For instance at D=4, "pending" files will execute (with silent alarm) but banned files will not execute.

Name bans are represented as a list of regular expressions and can include a wildcard (*), e.g., "*oo.exe" or "*msblast.exe", on the server. These lists have version numbers. As hosts poll in, they check their version numbers. When a host detects a mismatch, it then sends a GetNameBans query from the server (i.e., the hosts pull the new ban data from the server). Then these regular expressions are reevaluated against the name antibodies. Name ban is an attribute of state, and only has to be recomputed when the name ban list changes or when the file name changes. The wildcard list does not have to be compared on every file operation. So the dual nature of data antibody and name antibody is useful. Also, hundreds or thousands of name regular expressions can be simultaneously in effect without requiring thousands of regular expression match computations in the kernel for each file operation, which could be prohibitively expensive.

File Content Tracking

Referring back to FIG. 2, an intercept/block function 86 can intercept and read file access requests. It can suspend requests while obtaining policy information, block requests based on in-kernel policy, and return appropriate error codes for blocked requests. The function 86 reads from file access requests the requesting process name, a local system time of the request, the file requested (including full path), and the action requested (e.g., read, write, or execute). In one embodiment, function 86 feeds all file access requests to "stateful filter" 88, and every operation is blocked until filter 88 returns a flag indicating that the operation is either blocked or permitted.

Filter 88 intercepts file access requests from function 86 and returns an action of "block" or "permit" for most file access requests. Any file access request that cannot be associated with already-approved file access requests is forwarded to the kernel triggers and actions module 90, which returns an action of "block" or "permit". This action is stored by filter 88, and is preferably returned to function 86 for any subsequent associated similar file access request.

Filter 88 maintains cache 84 of already-open files (indexed by a kernel-wide unique identifier; e.g., kernel file handle in Windows NT). Each cache entry contains a file identifier (kernel file handle) and block or permit permissions for a read, write, or execute.

If multiple processes access the same file, each will have its own cache entry. If a given process attempts a new file access, the stateful filter will experience a cache miss for that file, which will cause it to submit the file access request to the triggers and actions module. The flag for the requested operation (read, write, or execute) should be set to "permit" if module 90 allows it. Otherwise, it should be set to "block". If a process which has only obtained one kind of permission (e.g., read) then tries another kind of access (e.g., write), module 90 will again be contacted.

Cache entries whose age exceeds a certain value (e.g., 60 seconds) may be deleted. This allows pruning of entries which for some reason are not removed. It also allows period re-checking of a file by module 90.

In this example, a file write operation is caught in the kernel in a blocking shim 86 by the host agent kernel program (HK) for a file "foo.exe". At a value of D=4, the file operation, here a file write operation, is caught by an activated "dirty tracking" policy, and this sets off a "dirty" event from the host kernel program to the host agent user space program (HU). This event specifies the filename and the dirty operation. The kernel cache 82 is not consulted for this operation, as the dirty tracking policy has that field nulled.

HU then performs a variety of local analysis operations in file and event processing 66 and analysis engine 68 on foo.exe. First, foo.exe is checked to see if it exists, if it is readable, and if it really is an executable. Other operations may be performed, such as the extraction of "interesting data" in filter 88; for example, script comments could be removed if the file were foo.bat. The extracted data of foo.exe is then cryptographically hashed, and this hash is used to attempt a lookup in the HU antibody cache 60. If the name and data already exist, nothing else is done. If the name is new, but the data is known, then a new name antibody is created in the UN cache. This process is all part of what is called the "Stage 1 analysis queue." Many files can be queued up waiting to be hashed in the Stage 1 queue on the host. The Stage 1 queue has only name antibodies and meta-information, since the data is not yet known or analyzed.

If the host has seen this file data and hash, then the corresponding known meta-information for that hash is associated with the host file meta-information for that file, retrieved from UD local memory or local disk stores, in that order. If the host has not seen this data, the UD cache "misses." The hash is put into a Stage 2 analysis queue. In reality, there are data antibodies, that is, states which logically track data, such as "Approved", "Banned", or "Pending," and there are also Name antibodies, e.g., "Banned by Name". For example, if the server bans "*oo.exe", then the name antibody for foo.exe will indicate "NameBan" and name-banning policies can block based on that. So even though the caches may know that foo.exe is already banned (by name), the dirty tracking resolution still continues. This distinction of the name and data antibodies is local in scope to the individual hosts, but it does become important for the FindFile function (described below) and for policy enforcement. The data antibody is thus put into the Stage 2 queue.

The Stage 2 analysis will attempt to resolve local state information from memory caches first, then from local disk-based data stores, and then from the server. If the server is connected, the Stage 2 queue will empty as the meta-information is resolved. When foo.exe is removed from this queue, the server is asked if it has seen this data hash, if that hash is not found locally. If the answer is no, then foo.exe and its hash and other meta-information is put into a Stage 3 queue for upload to the server. In addition, the server will send a default antibody state to the host, which is "pending", if the server has not seen the hash before or if the server analysis is not yet completed sufficiently to determine other states. If the server has already computed a valid antibody and state, it returns this antibody meta-information. If the server has never seen this data for foo.exe, it is new in the sense that all machines in the server's experience have never seen this file.

When foo.exe is removed from the Stage 3 queue, it is uploaded to the server using encrypted one-way transfer. That is, using FTPS (secure file transfer protocol) and a write-only server directory, files can be uploaded to the server but not downloaded. When the upload is successfully completed, the host informs the server that foo.exe was transferred. This transfer is referred to by hash, so as to minimize information leakage and for additional security.

When the server learns that foo.exe is uploaded, it starts by analyzing the file through several stages as the host does. A new antibody is created in this case, with the server using its synchronized verified clock to timestamp its first appearance. Also, the extraction and hash is performed, and those results supersede the host's.

Server analysis follows a schedule which is specified and stored on the server. This schedule is relative to the first appearance time of the file or its hash on the server. For example, if a file arrives at noon and the schedule is "Hash lookup at +0 and AV scan at +0 and AV scan at +2 hours", then at noon, the file hash will be computed and looked up using and external hash lookup service. Then an AV scan is performed. Two hours later, at 2 pm, another AV scan of that file is performed. Another way to describe the schedule is that it is relative to "file age on the server".

When an antibody changes state on the server, an incrementing counter value is written to the antibody. This counter is used to select just the range of antibodies which have changed since any particular host or super server checked in. For example, if a previous antibody change was glorp.bat transitioning from Pending→Approved and the global antibody version counter was 277, the server antibody corresponding to the hash of glorp.bat would get a version number 277 and the counter would be 278. So the version number corresponding to antibody foo.exe is 278 and the counter is 279.

When hosts periodically poll, they provide their last antibody version number, and the server will send all antibodies which have changed since the last poll. Preferably, the server sends the current number, and when the host realizes the mismatch, it asks the server for an antibody update, and the list of data antibodies is returned. These then are merged into the host antibodies, and changes are also sent down into the kernel too. Although the host may get and store some antibodies for data which it has never seen, generally only those antibodies which correspond to existing host files are merged. The others are usually discarded. The server caches the last few minutes of updates, to minimize the effect of custom-tailoring all the updates to each host. Again, since hosts typically get more antibodies than they need, and because new antibodies are rare, this traffic is limited. Antibody updates are small, as are most of the other messages.

Antibodies can remain synchronized with a super server in a similar fashion. Here, the super server can poll servers and get antibody update lists. The super server can merge them, and send out tailored updates for each server. These updates are all weakly consistent, in that they can lag by minutes or days, but there must be interlocks and safeguards to avoid "holes" in the updates.

There are other aspects and features related to merging of antibodies. For example, some servers may not accept certain antibody updates from the super server. Also, hosts will not permit certain local states to change to certain server specified states.

One issue is with the initial states of the cache and initial policies. The server cache can be preloaded with known good and bad hash antibodies, or it can be empty, and all is well. However, hosts must occasionally "Trickle Charge". For example, when a host first connects to a certain server, this fact is detected, and the host will perform a trickle charge where every single interesting file on the host file systems is inserted into the Stage 1 queue. A special value of D is engaged during this process to ensure that the indeterminate cache will not cause problems. Antibodies generally all start with state "pending", and they slowly synchronize with the server. Also, all host antibodies and queue information and related globals are persisted periodically and over reboots.

Kernel Cache Consistency

On boot or other initialization of the host agent, the kernel is loaded with every valid antibody known from user space, for every known existing host file which has valid meta-information. Some antibody updates are sent into the kernel as they are received from the server or from analysis queues in user space. However, some updates are the result of kernel cache misses. If a policy is determined to be active and if the antibody state is needed and if that state is not available, the kernel will generally stall the operation for some time and send up a kernel miss event to the user space. Some events may be stalled even if the antibody is not needed right away. This is the case when a policy permits the host user to override a restrictive state (Pending) by interacting with a user interface (message box popup), for example, clicking yes to override a blocked Pending operation and to cause subsequent restricted operations to succeed without blocking for some time.

In one example, an installation program unpacks a new program called inst.exe and then renames and executes it. The kernel will avoid temporary inconsistency by delaying the rename, and delaying the execution, while the analysis is performed. The resulting antibody is sent down asynchronously from user space, and then the pending operations unblock and the policy is evaluated with the required state information, as soon as the asynchronous update is completed.

The kernel cache contains antibodies for almost all files in the file system upon initialization. Operations that could leave holes in the kernel cache or other inconsistencies, even for brief times, are delayed and interlocked so that consistency is maintained. The user space caches are optimized to resolve kernel misses with very low latencies. Whereas the kernel and user space caches are quite insensitive to server-side latencies, the kernel cache is sensitive to interlocks and proper persistence.

FindFile

Because the UN and UD caches are preferably optimized for low latency lookups, these caches can be used as part of a distributed antibody query from the server, referred to here as the "FindFile" function, to produce a view of what files are on what hosts. A FindFile request can be specified by an administrator by submitting a web browser form via a web interface on a server or super server. For example, the following qualifiers can be jointly specified:

(1) a regular expression pattern specification for file name,
(2) a regular expression pattern specification for file path,
(3) a hash of contents of interest of a file,
(4) a hash or other ID of a container which is associated with a file,
(5) a time range of when a file or the hash of the file was first seen by the host,
(6) name of the host,
(7) IP address of the host,
(8) type of the file,
(9) one or more host file states associated with the file from a set of at least three states: approved, banned, pending analysis. For example, a set AllBanned=(NameBan, BanByHash).
(10) whether certain file operations have been performed by the host on the file, and
(11) a host group.

Figure 4:
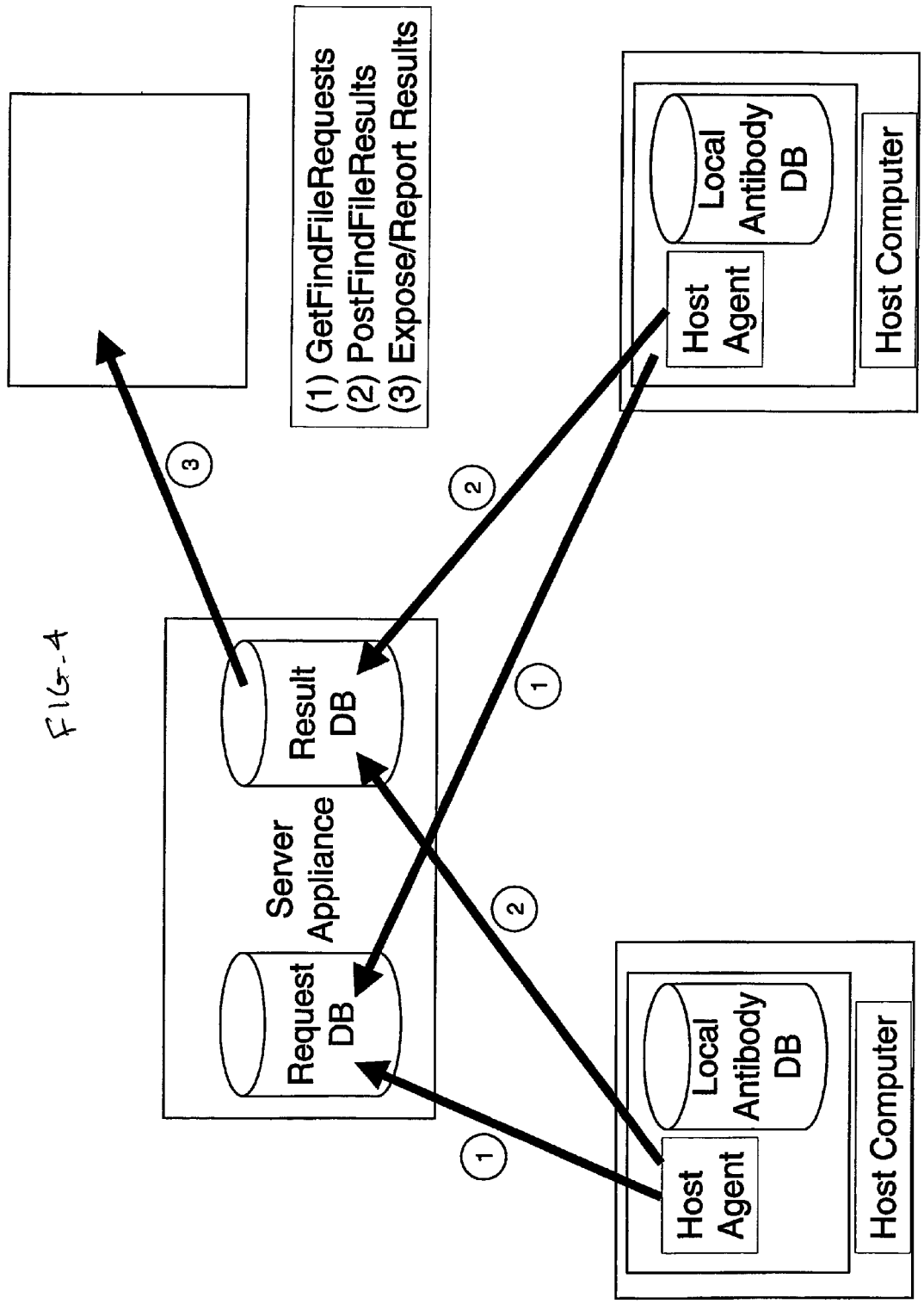
FIGS. 4-5 are schematics of processes performed by the system.

Referring to FIG. 4, a completed FindFile request is analogous to an email in that the server posts a request for later retrieval by specified hosts. As hosts check in, they learn if there are FindFile messages from the server waiting for them. When a host learns it has an outstanding FindFile request, it retrieves the requests using GetFindFileRequests, as shown as lines (1) in FIG. 4. In other words, the request is preferably accomplished as a "pull" from the server. This allows a more secure implementation with no listening host sockets needed.

The connected hosts each process their FindFile requests by accessing applicable data from their antibody caches, and post result lists to a results database shown as PostFindFileeResults (lines (2) in FIG. 4), including some or all of the following information for each file returned:

(1) a file name,
(2) a file path,
(3) a hash of contents of interest of a file,
(4) a time when a file or the hash of the file was first seen by the host,
(5) name of the host,
(6) IP address of the host,
(7) type of the file,
(8) container information for the file,
(9) one or more host file states associated with the file from a set of at least three states: approved, banned, pending analysis,
(10) whether certain file operations have been performed by the host on the file, and
(11) a host group.

In one implementation, all host-server communications (not just FindFile) are accomplished by the host first connecting to the server and sending one or more network messages, and receiving server replies for the host messages, before disconnecting. Again, this has an advantage of being more secure in that no listening host sockets are needed. There is an additional advantage in that only server addressing and routes need be maintained, rather than maintaining host addressing, routes, and reducing the need for discovery of such host information.

The server merges and builds up a master list of the FindFile result lists from the hosts. This union of these lists is the complete FindFile request response, and it builds up over time, usually completing in less than one minute. Since the local host processing only accesses the antibody caches, and not the host file system, these queries can be fast. The dual name and data antibody association system and caches permit this. The server then exports the results to the administrator, e.g., through a web interface. Also, certain FindFile results can affect and trigger SNMP, syslog, alarms, and other notification systems.

The super server can also post requests to be accessed by servers in a similar fashion, or a super server could directly submit FindFile requests to the servers. Then, servers could return the merged results to the super server, which then could merge these into a larger master result. This is analogous to the relationship between servers and hosts when processing a FindFile request.

Timer-Triggered Central Analyses

Figure 5:
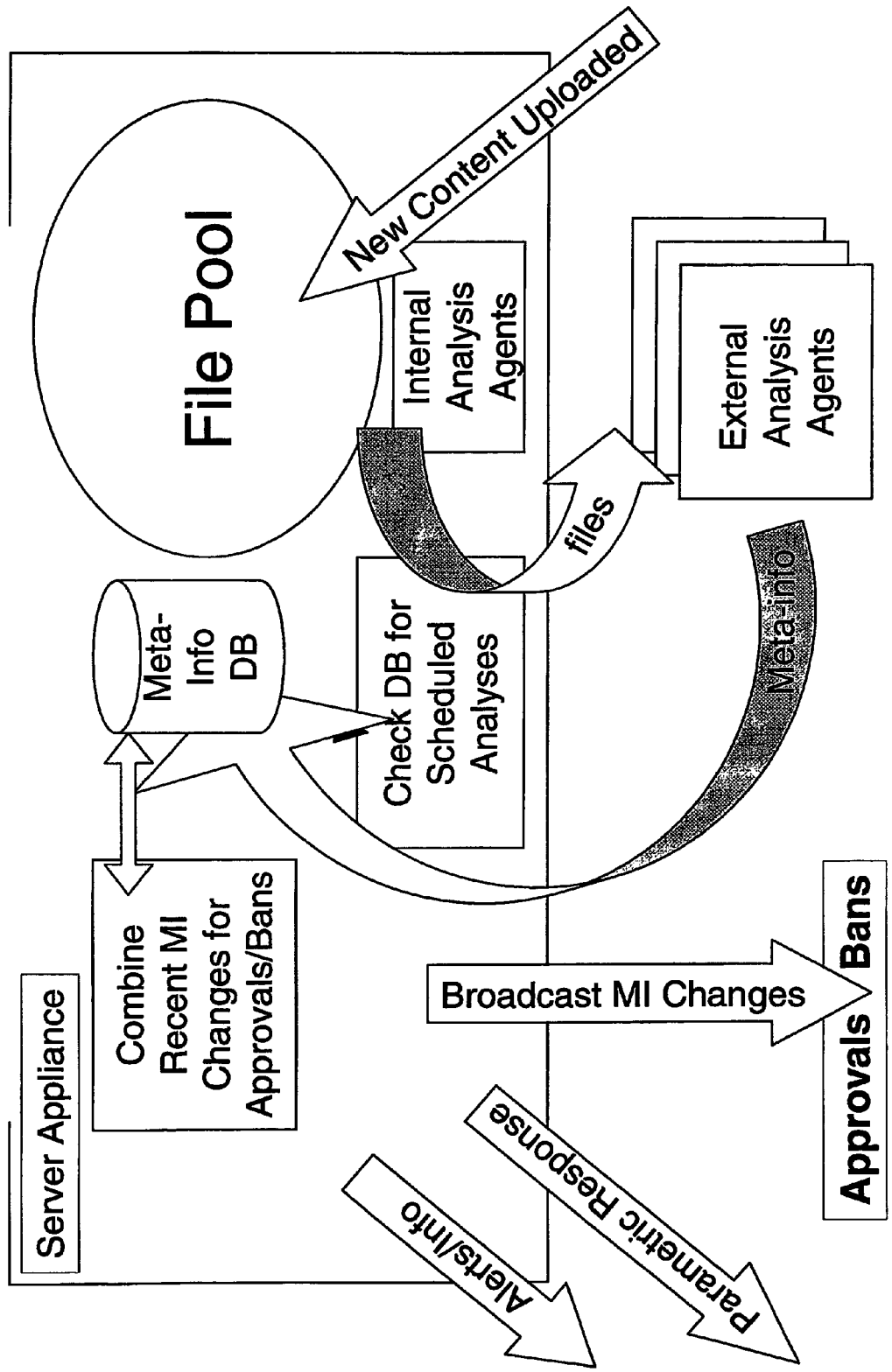

Referring to FIG. 5, a server can perform analyses based on events, e.g., an analysis each time a host uploads content, or the system can perform these analyses based on time. As indicated above, new content can be uploaded to the server, and analyses are performed with external and/or internal analysis agents to create metadata or meta-information that is stored in a database. The system can then check for further scheduled analyses, e.g., after certain time intervals relative to a first observation of a file when new content is uploaded. The servers and super servers can perform many types of further time-based analysis.

Figure 6:
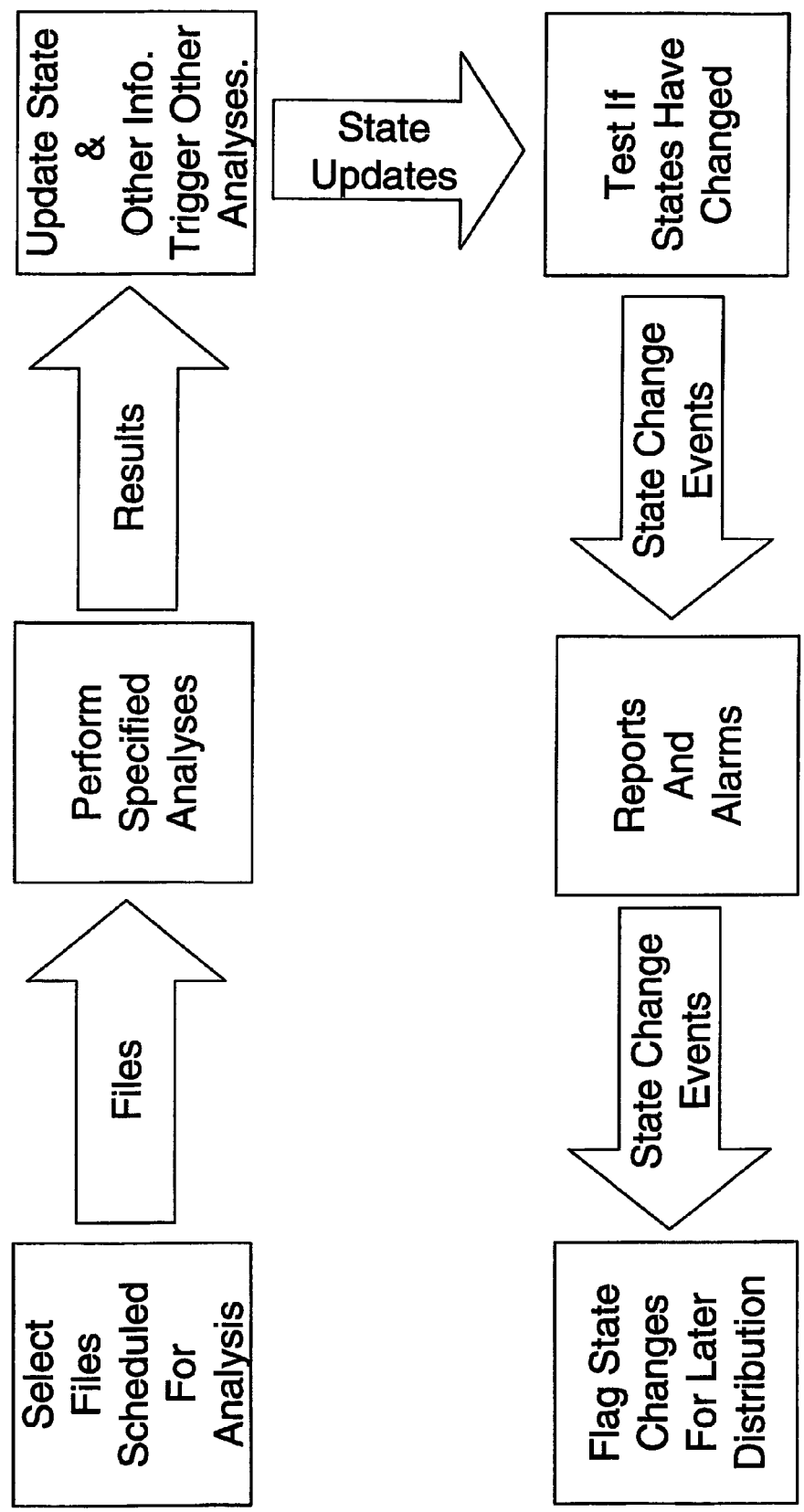
FIG. 6 is a chart showing an example of timed analyses.

Referring to FIG. 6, as a file is first seen and its antibody is added to a server database, the effect is as if a timer is started for each file. So, for example, the time intervals could be (t=0=immediate, t=12 hours later, t=2 days later, and t=30 days later after the first sighting or report to the server), and could be based on the server's clock. Periodic actions, in addition to one-time timed actions, can be specified. As shown here, antivirus (AV) and anti-spyware (AS) scans can be performed at different times, and other analyses can be performed. For later time periods, this could be a comparison to others servers that may have looked at the files. Typically, the later analyses would be based on all files first seen within some time period. For example, all files first seen within a 1 hour time would get the 12 hour analysis 12 hours from the last file in the time period.

Referring to FIG. 7, the system selects files for analysis and sends the files to perform specified analyses. Different operations can be specified for each time interval. Since the files are kept for a while on the servers, these time-activated analyses can proceed whether the original Host is still connected or not. Examples of central timed server analyses that can be performed include:

(1) Compute alternate hashes (e.g., using MD5 or SHA1 algorithms), verify the reported hashes, and store all of the hashes.
(2) Authenticate and sign content with server credentials or other third party credentials.
(3) Lookup hashes against known bad databases (black list) either locally or via query of another server
(4) Lookup hashes against known good databases (white list) either locally or via query of another server
(5) Lookup hashes against known product classification databases to identify the product (and other information) which corresponds to the file hash
(6) Send files for virus scanning (e.g., by FTP or SMTP as MIME attachments for example) or perform locally
(7) Send files for spyware scanning as in (4) or perform locally
(8) Send files for site-specific custom analysis as in (4) or perform locally
(9) Export files to a special restricted-network-access subdirectory on a network file server (e.g., authenticated samba or FTPS)
(10) Send SNMP traps that new files need analysis and specify their locations
(11) Send Syslog or email messages that new files need analysis and specify their locations
(12) Check certain directories to see if another system has approved or disapproved of the file
(13) Perform custom analyses on the server
(14) Automatically perform a second analysis conditioned on the result of a first analysis
(15) Receive authenticated network messages containing analysis results from external analysis systems The results of the above analysis are summarized on the server, which updates the state in the meta-information store (124), particularly the state for broadcast to the hosts. The server makes recommendations as to whether a file should be approved or banned. Information is summarized so that administrators can approve or ban groups of files with one web browser action. Optionally, the results from the analysis above can be used to automatically approve or ban files with certain antibodies. The server can provide reports, alarms, or further information, and can alter the parametric D value for all or one or more groups of hosts. The server flags the state changes for later distribution through updates (130), preferably in a manner that the hosts pull the update from the server.

Antibody Analysis/Approval Services

Since the system focuses on new files, outsourced file analysis services can be made practical and useful. These services can be automated (e.g., with SOAP/Web Services calls) or manual (follow authenticated links to the servers of a service provider). These services, which can be performed locally or off site using remote servers, can include:

(1) Entering a hash manually or follow a pre-computed web link to get query results of known good and bad database lookups. Entities, such as companies, may want to maintain global white lists or global black lists. The latter will not work for hashes because they are too numerous. The former will not work because different companies have different policies which qualify "good" programs. These services handle white/black/gray lists and voting as indicated below.

(2) Find antibodies related to a particular antibody (e.g., groups of files associated with the same application or similar applications)

(3) Identify vendor and application associated with the hash (4) Find out how many companies and computers have that file and for how long. These companies would not be identified be name, only counted. The service provider would gather this information confidentially as part of this service. The service provider creates the double-blind database of the results and the service.

(5) Find out how many companies have banned or approved the file, and which files they have approved along with it. Again, these are all blind and done by hash, from the perspective of the end-user. The service provider does not need to gather or store file names or file data, just the meta information in the form of the antibody. In fact, file names, and certainly files themselves should be considered proprietary information.

(6) Automated server-side approval based on the results of the above queries as well as based on server-side analysis too.

Content Extractor (CE)

Figure 8:
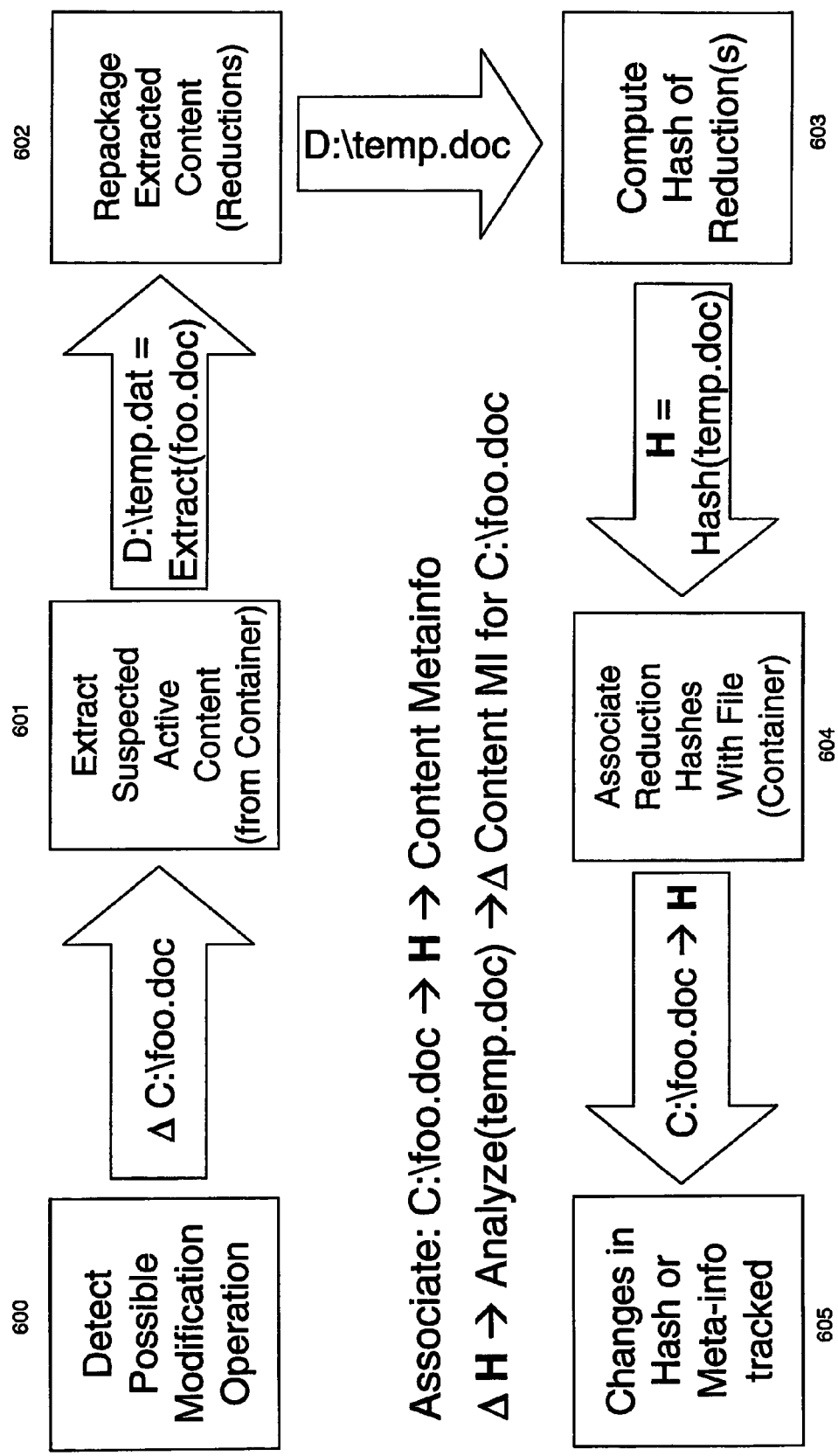
FIG. 8 is a schematic of a content extraction process.

Content usually forms groups or packages of content. Examples of this include executable programs and viruses inside of zip files or macros inside Microsoft Office documents (e.g., Word, Excel, and Powerpoint files) or files inside installation packages, such as Microsoft .msi files. Referring to FIG. 8, a file is received and the content extractor looks for embedded content types, e.g., macros inside an Office document. Preferably only such "active" types of content are extracted.

After detecting a possible file modification (600) or unknown state, the extractor takes the extracted portion(s) and converts them into a valid content file type, e.g., a Word (.doc) file with no text or figures, to repackage them. This process is illustrated as steps 600-605. The resulting repackaged file is generally much smaller than the original file (the "container") and is referred to as a "reduction." A hash of the reduction is computed (603), and the reduction hashes are associated with the container hash (604). Containers can be nested and those has associations are tracked as well. Later, if the content needs to be uploaded, only the reductions are uploaded. Optionally, the container file and its meta-information can be uploaded based on the result of the analysis of the extraction. Root containers and their meta-information may be uploaded based on the result of the analysis of the extraction. For example, a file setup.exe contains a file main.cab which in turn contains a file install.exe. Relative to install.exe, main.cab is the parent container for install.exe, and setup.exe is the root container for install.exe as well as the parent container for main.cab. All of these associations are stored, preferably saved as relationships among the hashes of the individual files.

This process reduces the network traffic and footprint of the analysis stages, and it permits tracking of embedded content only and not macros associated with other files (e.g., inherited document templates). This is not true of methods that intercept macros upon their loading. The extractor permits location-independent embedded macro detection and tracking.

The repackaging of reductions as other valid file types has the advantage that the reductions are compatible with third party analysis systems, e.g., macros repackaged as small Word documents can be sent as email attachments to a virus scanning email gateway. Another example is a zip file, temp.zip, containing 5 files, only one of which is active, foo.exe. The reduction of temp.zip could be a zip file foo.zip with only foo.exe in it, or the reduction could be foo.exe itself. The signature of foo.zip or the signature of foo.exe is preferably associated as the signature corresponding to temp.zip. The reduction could again be emailed to an AS scanning email gateway. Some containers are devoid of active content, and as such may not be tracked. There are efficiency advantages in tracking reductions, but there are also advantages to detecting and analyzing only new content. In this way, more accurate statistics, alarms, and analysis can be produced. The automatic and specific early detection of unclassified content, such as Pending state files, permits powerful policies and content management.

Server User Interface

The user interface for the server provides a number of "panels," each of which allows the configuration and management of a different aspect of the system. In this section the term "user" is used to indicate an administrator who has access to the server user interface. The user interface can be accessible through a standard web browser, via an SSL encrypted connection. Authentication and access control are provided to maintain the integrity of the server and to determine the privilege level of a particular user.

When the user first accesses the system, the user is authenticated and assigned a privilege level based on this authentication. This privilege level determines whether the user is allowed unlimited access or read-only access; finer granularity of access can also be provided. User actions are tracked and logged by username and time. Certificates installed on the server can be used to control and encrypt both access to the user interface and also to provide signatures for and possible encryption of information returned to the hosts. These certificates may be installed and updated in a maintenance panel. All input to the interface should be properly validated to ensure that the server is supplying correct information to the hosts in their configuration.

A network status interface provides an overview of the running system, including: recent events and associated information, including unique file identifier, event time stamp, event type, event priority, file type and name, and host system, identified by both name and unique identifier. The interface also provides summary information on the state of the system during certain time periods (e.g., last hour, last day). More detailed information is available in a statistics panel. Information displayed here includes numbers of new executables detected, new scripts detected, files with new embedded content, unapproved files, and infected files.

A statistics panel displays more detailed statistics collected by the system. This information includes the number of the following events in various time periods (e.g., last hour, last 24 hours, last week). It can include, for example, numbers of new executables seen on the network, new scripts, files with new embedded content, new web files (HTML, ASP, etc.), files that have yet to be approved, either manually or by scanning, files approved by the scanning process, files approved manually or via auto-approval, files that are failing a scan, files that are known infected that have been blocked, executables that are banned and were blocked, total events processed by the server since it was first installed, and events since last restart.

Along with the statistics for each category, the user can view "top ten lists" of an item, highlighting the most frequently seen instances of each across all hosts managed by the server. Examples of Top10 lists include top ten recently discovered files ranked by count of how many hosts have at least one copy of the file, with variants of this list including count-by-unique-hash, count-by-unique-file-name, count-Banned-by-hash, count-Banned-by-name, count-recently-banned, count-recently-updated/modified, count-by-unique-group/container/root-container/product. Top10 lists are updated and exported via SNMP. A configuration panel can be used to configure alarms and automatic responses based on Top10 counts and other updated variables. Alarms include log reports, SNMP traps, syslog messages, email notifications, and other network messages. Responses include banning files, approving files, changing parameter D for one or more host groups, changing policy for one or more host groups, changing the host group assignment of one or more hosts, and analyzing files.

The statistics panel also includes overall information about the system, including: the total number of hosts served by this server, broken down by active and inactive (an inactive host is one that has not recently contacted the server); the total number of antibodies in the server database; and uptime, i.e., how long the system has been up since the last reboot.

Statistical information displayed on this panel is also available via SNMP (Simple Network Management Protocol) query to the server, allowing integration with network management systems.

A plots panel allows the user to plot and print graphs and charts of recent activity. This panel may be combined with the statistics panel. Plot information may also be available in XML format for display in external applications. Examples of graphs that may be plotted include activity over a recent time period (one hour by minute, one week by hour, etc.), or graphical displays of the "top ten list."

There may be some limitations on the variety of plots available, due to constraints on the statistical information retained by the server. Where the administrator is using an SNMP management system, it too may be able to provide statistical plots in a format that is already in use within the organization.

An antibody database panel allows the user to interact directly with the antibody database stored on the server. The content of the database is displayed and the user may choose to sort the display by different criteria or to limit the display by choosing filter patterns. The user may also interact with the antibodies themselves; these operations are detailed below.

The server may use an ancillary informational database that includes fields that are not required in the main antibody database. An example of fields in this database might be the first file name seen or the initial file class.

For each file, the following information is displayed on this panel:

Time First Seen. When the file or hash was first seen by the hosts and reported to the server.
File ID. A unique identifier for the file, including one or more hashes of content such as MD5, SHA-1, and OMAC.
File Type. The file class (e.g. executable, script, office document, archive, etc.). This is derived from the file name as it was first seen (see below) and also from analysis of file contents.
Status/State. The current file status, including Approved, Pending, Banned.
Method. The way in which the server learned about the file (automatically, manually, etc.).
Filename. The name of the file, as first seen and reported to the server. This may not be the file's current name, but is just the name of the first instance seen on the network.
File Path. The path of the file, as first seen and reported to the server.
First Seen Host. The name of the host on which the file or hash was first seen and reported.
Analysis Results. The result of the latest scans or other analyses.
First Analysis. The time of the first scan/analysis of the file.
Last Analysis. The time the file was last scanned/analyzed.
Last Updated. The time the file state was last modified.
Parent Containers. Links to other files which have been associated with the file.
Parent Container Attributes. File name, first seen time, first seen host, file path, product classifications, and state of one associated container file.
Root Containers. Links to other files which have been associated with the file. A root container is one which is not contained in another container.
Root Container Attributes. File name, first seen time, first seen host, file path, product classifications, and state of one associated root container file.

The following operations can be performed on a file selected from the list:

File Detail. This provides additional information on the file from the antibody database, including the interface user who approved or banned the file, where the file was first seen and any comments added by users.
Approve. Explicitly approve the currently selected files. This option should provide the user adequate warning, since it will approve the files across all hosts.
Unapprove. Explicitly unapprove files that are already approved, preferably transitioning state to Pending.
Ban. Explicitly ban a file. This causes the file to be banned on all hosts.
Analyze/Virus Scan. Force the scheduling of an analysis/scan for the selected files.
Delete. Remove information on this file. This will cause the server to treat the file as new the next time it is seen.
Find Files on Hosts. This operation links to the file finder, providing the selected file names as input.
Find Containers. Lookup possible containers for the file and information for those containers.
Find Root Containers. Lookup possible root containers for the file and information for those containers.
Find Web-Service Information. Query various other network servers to find additional information about the file and/or its containers/products.

A file finder panel allows the user to initiate a best-effort process of finding the locations of a particular file on all the managed hosts. Since this process may be time consuming, the user will be notified before initiating a new search. The file finder may not be implemented in all versions of the product. FindFile progress may be reported during partial completion of the query.

The process may also be initiated from the antibody database panel (see section 0) by selecting a particular file or files, which then brings the user to the File Finder panel with the appropriate information filled in automatically.

This process requires all hosts that are in communication with the server to return status asynchronously, so the panel will open a new view to dynamically display the results as they are received. If the user initiates another search, the current search will be terminated. Multiple file searches may be permitted in future versions.

A host group panel allows the hosts known by the server to be associated with a particular logical group. Full group functionality may not be available in initial versions of the interface, in which case this screen will display information about the single group supported by this server.

The panel supports the manipulating group membership, including:

Addition of new groups.

Removal of existing groups. When a group is removed, the hosts are not removed from the server's database, but are reassigned to a default group.

Moving hosts from one group to another.

The following information is displayed on this panel about each host:

Host. The host's DNS name.

Unique ID. The host's unique identifier.

IP Address. The last known IP address of this host.

Status. The online status of the host.

Last Seen. The last time that the host checked in with the server.

Operating system. The operating system version of the host.

Version. The version of the operating system on the host.

A file classes panel allows the viewing and editing of the file extensions that are mapped to each class. Some classes, as below, are defined by extension. Other classes are determined by analysis of content. Some classes are determined by both extension and analysis. These extensions are read only.

Some pre-defined extension classes are:

Executables. Extensions including exe, com, dll, pif, scr, drv, and ocx.

Scripts. Extensions including vbs, bat and cmd.

Embedded Macro Content. Extensions including doc, dot, xls, xla, xlt, xlw, ppt, pps and pot.

Web Content. Extensions including htm, html, asp, and cgi.

A policy panel is the core of the configuration of the server. The user can display and edit the policies enforced on all the managed hosts, grouped by host group. This panel also displays the current global D setting for the currently selected group.

This section allows the user to define the global D level for the currently selected group. When a new D level is chosen, the change is not immediately applied, but must be selected explicitly. Choosing a new proposed D level changes the display of the policy information and actions to show those for this new level. Navigating away from the panel will not apply the changes.

The policy list displays the various actions and effects of particular D levels on particular file classes (e.g. executables, scripts etc.). Policies may be enabled or disabled, but not edited. The following policies are included on the list:

New Executables
New Standalone Scripts
New Embedded Scripts
New Web Content
Unapproved Files
Ignore Update Agent (automatically approves new content from certain update sources/processes/locations)
Virus/Spyware Infested Files Whenever a policy is disabled, tracking of files of that class still continues, but no action is taken by the host systems affected.

For each policy, an action grid is displayed. The grid indicates which policy settings apply at the currently selected D level.

Action

Block Execution. Will execution of this file class be blocked?

Block Write. Will writing to files of this file class be blocked? This setting is only used for web content and unapproved files. It is used for tightly controlled systems only and not for normal operation.

Quarantine. Will files of this class be quarantined? Files may be quarantined by blocking reading, rather than moving to a separate directory. In the case of virus infected files, these may be written, but later deleted, but this functionality may also not be implemented initially.

Log. Will access to files of this class be logged?

Approval

Implicit Approve. Will files be implicitly approved at this D level? An implicit approval changes the approved state of the file after appropriate scans and waiting time.

Explicit Approve. Will files be explicitly approved at this D level?

An action grid similar to the one illustrated above shows the user a representation of the effects of particular D levels in combination with the pre-made policies. The tables below show an example of combinations of the actions and pre-made policies at the various D levels (zero through seven).

Notifier Parameters

When content access is blocked, the host user is notified. For each policy on the list, and for each host group, the following settings are available:

Message displayed. The text displayed on the user interaction dialog. Multiple messages are listed in a list box.

Button text. The text displayed on the single button on the user interaction dialog.

Timeout. How long the dialog will be displayed to the user. A timeout of zero indicates until accepted by the user, and the dialog remains displayed indefinitely.

Optionally, for certain values of D, a button to override content restrictions for a period of time.

URL link with more information on the policy

The notification parameters also include a global setting that defines the image displayed at the host along with the notification message. These settings are configurable for each of the pre-made policies individually. Notification parameters are edited in the server administrative interface. Those parameters are associated with policies which are in turn assigned to host groups and propagated to hosts as policy changes.

Scan Age Parameters

This section allows the user to configure the time between when a file is first seen and is approved (auto approval scan), the time that the second (approval) scan is conducted and the time that a third (repeat) scan occurs. More scans and times can be specified as in FIG. 7.

Maintenance

The Maintenance section allows the user to configure global settings for the server itself.

System Configuration. Settings related to the server's interaction with the local network and host systems.

IP address and subnet masks. Subnet masks permit classification of hosts into Remote and Local types. Remote hosts have more restricted communications to conserve bandwidth. Host groups may have different policy set and D parameter settings, which are specified for each connection type Remote, Local, or Disconnected. Remote hosts will generate less network traffic, for example, fewer server reports. And remote hosts preferably report hashes of new content to the server, but not upload the content.

IP routing information.

Passwords. Set or reset passwords for access to the server interface.

Certificates. Install certificates from removable media (and optionally the network). These are used by the hosts to verify the identity of the server and also for the SSL interface to the server.

SNMP. Set a list of SNMP servers to receive traps and be allowed to query the server's configuration.

SNMP trap selection. Select which event type causes which traps and to which SNMP service the trap will be sent (and also priority critical, high, medium, low, informational, etc. . . . ).

Syslog. Set a list of servers to receive logging information via syslog for various event types and priorities.

NTP time synchronization server. Set a list of servers for time synchronization. Time on the server is taken from its internal clock at boot time and then synchronized with this external NTP time source. Host deviations from server time will be tracked by the server.

System Status (Server)

Uptime. Display the time since the last system reboot.

Software version. Display the version information for the server software.

Disk space. Display local disk and storage statistics for the server.

Virus/Spyware Signature Updates

Last Signature Update. The time of the last signature update.

Update service configuration. Configure the update service for the installed anti-virus software, including download locations and schedules.

Update Scanner. Update the virus scanner software.

Update Signatures. Force an update of the virus signatures.

Server Software Update

Current Version. Displays the current server software version.

Reboot. Reboot the server using the currently installed image.

Load new image. Load a new software image to the server from removable media or the network (e.g., via FTP).

Revert to previous version. Revert to the previously used software image.

External Service Configuration.

Network address, service type, and approval authority for content scanning systems.

Network address, service type, and approval authority for meta-information sharing services.

External file server addresses, protocols, logins, and directories for external content transfers and user-defined analyses.

External content notification services configuration for SNMP, syslog, email, and SOAP notification of new content.

Backup. Backs and restores the configuration to removable media (and also to the network).

Save configuration and database. Save the configuration and antibody database (e.g., via XML)

Load configuration and database. Load the configuration and antibody database (e.g., in XML).

The server includes processing capability, such as a programmed microprocessor, digital signal processor (DSP), or application-specific processing and memory. Hosts can include personal computers or similar computers, or other processing devices, including handhelds, PDAs, or other devices on a network.

Having described embodiments of inventions herein, it should be apparent that modifications can be made without departing from the scope of the inventions as claimed.

What is claimed:

1. A computer-implemented method comprising:
receiving a first file by a computer;
extracting content of interest within the first file, wherein said content of interest is less than the entire first file;
wherein the content of interest includes one of an executable, script, archive, or installer;
repackaging the content of interest into one or more files of valid formatted type to produce a first reduced file;
applying a signature to the reduced file; and
storing the signature and associating the signature with the first file.

2. The method of claim 1, further comprising performing the acts of claim 1 with respect to a second file and comparing the signature of the first reduced file and a signature of the second reduced file to determine if they are the same.

3. The method of claim 2, wherein the signatures include one or more cryptographic hashes of the file contents of interest.

4. The method of claim 1, wherein the acts of claim 1 are performed on a host computer, and wherein the first reduced file is transferred to a server associated with the host computer for further content analysis.

5. The method of claim 1, wherein the content of interest includes a macro.

6. The method of claim 5, wherein the content of interest is repackaged as a word processing document.

7. The method of claim 1, wherein storing the signature further includes storing a date for when the reduced file or its signature was first seen.

8. The method of claim 1, wherein the first file is a presentation file with presentation slides.

9. The method of claim 1, further comprising sending the first reduced file as an email attachment.

10. The method of claim 9, wherein the email attachment is sent to a gateway with virus scanning capabilities for email attachments which scans the attachment.

11. The method of claim 1, wherein the content of interest is repackaged as a word processing document or an archive file.

12. The method of claim 1, wherein the signature includes one or more cryptographic hashes of the file contents of interest.

13. A computer system comprising:
a memory including meta-information regarding files, including, for each file, a signature of the contents and state information indicating whether and with what conditions certain specified file operations can be performed;
a host computer responsive to receiving a first file for extracting content of interest within the first file, wherein said content of interest is less than the entire first file,
wherein the content of interest includes one of an executable, script, archive, or installer,
repackaging the content of interest into one or more files of valid formatted type to produce a first reduced file,
applying a signature or hash to the first reduced file; and
storing the signature or hash and associating the signature or hash with the first file.

14. The system of claim 13, wherein the signature includes one or more cryptographic hashes of the file contents of interest.

15. The system of claim 13, wherein there is a plurality of host computers and a server associated with the plurality of host computers, the host computer providing the signature to the server for storage.

16. The system of claim 15, wherein:
the host computer receives the first file by detecting operations which could alter the content and/or name of a file;
the host computer looking up file meta-information by file name or signature of file name on a local meta-information store;
if the file name or signature is not found, providing a query to the server based on the hash of the contents of the first file;
if the file name or signature is found, accessing the meta-information to determine whether and with what conditions certain specified file operations can be performed.

17. The system of claim 16, wherein the signature includes one or more cryptographic hashes of the file contents.

18. The system of claim 16, wherein the host checks the server periodically to get meta-info updates.

19. The system of claim 18, wherein files are automatically transferred from host to server based on server meta-information.

20. The system of claim 15, further comprising automatically performing a further analysis of the file a defined period after the file is first seen.

21. The system of claim 13, wherein the meta-information includes, for each file, a file name, a signature of the first reduced file, and at least one of approved or banned or unknown state information indicating whether and with what conditions certain specified file operations can be performed.

22. The system of claim 21, wherein the meta-information has multiple approved or banned states for different operations, including execution and a write operation.

23. The system of claim 22, wherein the server stores meta-information in a data store and the host computers store a cache of the meta-information in the data store, the server causing updates to be provided to the host computer caches.

24. The system of claim 22, wherein the server stores content hashes, file names, approved and banned states, and a date the file or the hash of the file is first seen by the server.

25. The system of claim 24, wherein the server stores a pending state in which an operation is allowed pending further analysis to change the state to allowed or banned.

26. The system of claim 23, wherein the meta-information maintained in the server further includes a history of recent state changes and reason for changes and a time the meta-information last changed.

* * * * *